(12) United States Patent
Kataoka

(10) Patent No.: US 7,529,463 B2
(45) Date of Patent: May 5, 2009

(54) SPECULATIVE RECORDING DEVICE

(75) Inventor: Mitsuteru Kataoka, Katano (JP)

(73) Assignee: Panasonic Corporation, Osaka (JP)

( * ) Notice: Subject to any disclaimer, the term of this patent is extended or adjusted under 35 U.S.C. 154(b) by 930 days.

(21) Appl. No.: 10/507,186

(22) PCT Filed: May 21, 2003

(86) PCT No.: PCT/JP03/06313

§ 371 (c)(1),
(2), (4) Date: Sep. 10, 2004

(87) PCT Pub. No.: WO03/098926

PCT Pub. Date: Nov. 27, 2003

(65) Prior Publication Data

US 2005/0238315 A1 Oct. 27, 2005

(30) Foreign Application Priority Data

May 22, 2002 (JP) .............................. 2002-147847

(51) Int. Cl.
*H04N 5/91* (2006.01)
(52) U.S. Cl. .............................. 386/52; 386/96; 386/83; 386/65; 386/124; 386/46; 386/95; 386/109
(58) Field of Classification Search .................. 386/46, 386/95, 109, 52, 96, 83, 65, 124
See application file for complete search history.

(56) References Cited

U.S. PATENT DOCUMENTS 6,385,389 B1 * 5/2002 Maruyama et al. ............ 386/95

6,515,950 B1 * 2/2003 Tanikawa et al. .......... 369/53.24
7,493,079 B2 * 2/2009 Koizume et al. ............ 455/3.06
2002/0031327 A1 * 3/2002 Watanabe et al. ............. 386/46
2002/0100047 A1 * 7/2002 Matoba et al. ................. 725/46

FOREIGN PATENT DOCUMENTS

| JP | 2000-13708 | 1/2000 |
|----|------------|--------|
| JP | 2001-69415 | 3/2001 |
| JP | 2001-169235 | 6/2001 |
| JP | 2001-209660 | 8/2001 |
| JP | 2001-268488 | 9/2001 |
| JP | 2001-283525 | 10/2001 |
| JP | 2001-292422 | 10/2001 |
| JP | 2002-77755 | 3/2002 |
| JP | 2002-101391 | 4/2002 |
| JP | 2002-112186 | 4/2002 |
| JP | 2002-218363 | 8/2002 |
| JP | 2002-354391 | 12/2002 |
| JP | 2003-163847 | 6/2003 |
| JP | 2003-189214 | 7/2003 |

* cited by examiner

*Primary Examiner*—Thai Tran
*Assistant Examiner*—Helen Shibru
(74) *Attorney, Agent, or Firm*—Wenderoth, Lind & Ponack, L.L.P.

(57) ABSTRACT

In a speculative recording device, a profile extracting unit extracts a user profile which indicates a preference of a user in viewing programs based on an operation by the user, and a program list managing unit acquires attributes of a program. Moreover, a speculation selecting unit selects a program to be speculatively recorded based on a user profile and the attributes of the program, a storage managing unit accumulates program data, and a speculative recording managing unit erases the program data accumulated in the storage managing unit when necessary and records program data selected by the speculation selecting unit.

3 Claims, 19 Drawing Sheets

F I G. 1 3

| PREPROGRAMMED RECORDING REQUEST IDENTIFIER Rr | REQUEST SOURCE IDENTIFIER Isr | PREPROGRAMMED RECORDING PROGRAM IDENTIFIER Ip | SPECULATION SCORE Ps |
|---|---|---|---|
| IR1 | 1200g | 5/20 9:00 – 9:30 1ch | 8 |
| IR2 | 1200g | 5/21 20:00 – 20:45 5ch | 9 |

FIG. 15

| PREPROGRAMMED RECORDING IDENTIFIER IRr | PREPROGRAMMED RECORDING PROGRAM IDENTIFIER Ip | RECORDING MODE IDENTIFIER Fr | REQUESTED PROGRAM SPECULATION GRADING SCORE EPs (Ps × Ek) | REQUEST SOURCE IDENTIFIER Isr | REQUEST DESTINATION IDENTIFIER Ise |
|---|---|---|---|---|---|
| IIR1 | 5/10 8:15 – 8:30 1ch | SPECULATIVE RECORDING PREPROGRAMMING | 3 × 0.8 = 2.4 | 1200g | — |
| IIR2 | 5/20 9:00 – 10:00 5ch | SPECULATIVE RECORDING PREPROGRAMMING | 2 × 1 = 2 | 1200gr | — |
| IIR3 | 5/20 9:00 – 9:30 1ch | SPECULATIVE RECORDING PREPROGRAMMING | 8 × 0.5 = 4 | 1200gr-b | — |
| IIR4 | 5/21 20:00 – 20:30 7ch | SPECULATIVE RECORDING PREPROGRAMMING | 6 × 1 = 6 | 1200gr | — |
| IIR5 | 5/10 8:00 – 9:00 7ch | PREPROGRAMMED RECORDING REQUEST | 6 × 1 = 6 | 1200gr | 1200gr-b |

IIR

SPECULATIVE RECORDING DEVICE

BACKGROUND OF THE INVENTION

1. Field of the Invention

The present invention relates to a recording device, typified by a PVR (Personal Video Recorder) or an HDD (Hard Disk Drive) Video Recorder. The recording device is used in a receiving device having a function of once accumulating a program which is broadcast or delivered in real time via an electrical transmitting means such as digital broadcasting and the Internet, making it possible to view it asynchronously to broadcast or delivery. More specifically, the invention relates to recording devices which are used in receiving devices which are connected with one another at all times via a network.

2. Description of the Related Art

FIG. 16 illustrates a structure of a receiving device including a conventional recording device. The receiving device 1200 includes a receiving unit 101, a program decoder 102, a UI controlling unit 103, a display unit 104, an input unit 105, a program list managing unit 106, a storage managing unit 107, a chasing unit 108, and a preprogrammed recording unit 109.

The receiving unit 101 is connected to a transmission path using an electric wave, an electric wire, an optical fiber, or the like as a medium and extracts information of a program in real time which is transmitted thereto via the transmission path. The information of the program includes the substance of the program expressed by an image, a sound, and character information, an electronic program list which is metadata of the program, and the like. In order to take out information of a particular program from a transmission path through which a plurality of programs are broadcast at the same time, the receiving unit 101 extracts digital data of desired program information by designating an ID or the like which identifies a broadcasting frequency of the program to be taken out or a transmission unit of packets and the like which constitute the program.

The receiving unit 101 is composed of, in the case of a digital broadcasting tuner, for example, a BS/CS tuner module and a transport decoder. The program decoder 102 receives an image, a sound, character information, and the like which are contained in the output from the receiving unit 101 or the storage managing unit 107 and decodes them. The program decoder 102 is composed of an MPEG2 (Motion Picture Expert Group) decoder, a BML (Broadcasting Markup Language) browser and the like as being used in a digital broadcast tuner.

Note that MPEG2 is defined by ISO/IEC 13818-1, 13818-2, 13818-3, and the like, which are international standards, and is regularly used for encoding digital images and audio data. BML is a language, based on XML (eXtensible Markup Language), for multimedia encoding in digital broadcast and is used for digital broadcast in Japan. BML is defined by ARIB STD-B24, a written standard by Association of Radio Industries and Businesses, a Japanese standardization organization.

A user interface (User Interface; hereinafter referred to as "UI" for short) controlling unit 103 realizes interactive processing with a user by managing the state transition of a display screen. The UI controlling unit 103 outputs a signal to be displayed on the display screen while combining an OSD (On Screen Display) display with an image outputted by the program decoder 102. The UI controlling unit 103 further changes the state of the display screen in accordance with an instruction of the user inputted from the input unit 105 and generates a transition control signal Sc which makes the state of the receiving device 1200 transit. In other words, the UI controlling unit 103 is connected with the chasing unit 108 and the preprogrammed recording unit 109, and realizes state transition by controlling these units so as to control each other. Note that the UI controlling unit 103 can be composed of a graphic engine which generates a signal of OSD and a computer for control thereof.

FIG. 17 illustrates an example of an accumulated program list screen which is presented by the UI controlling unit 103 onto the display unit 104. The accumulated program list screen includes an accumulated program section IPR made up of a plurality of rows (in the present example, five rows, that is, row L221, row L222, row L223, row L224, and row L225) for showing information concerning programs managed by the storage managing unit 107. In each row of the accumulated program section IPR, detailed information about the program which is assigned to the row is shown in a plurality of columns (in the present example, four columns, that is, column C231, column C232, column C233, and column C234). Specifically, the recording date and time of each program is shown in column C231, the broadcast channel thereof is shown in column C232, and the program name thereof is shown in column C233. And whether the data of a program which has been recorded, that is, accumulated is to be automatically erased or not is indicated in column C234.

Note that at the top of the accumulated program section IPR, a program information label LIP for indicating the kind of detailed information to be displayed in each column is placed. At the side of the accumulated program section IPR, in order to display more than five pieces of program information, a scroll bar 240 for replacing displayed rows is arranged. As is exemplified in the present figure, in the scroll bar 240, a pointer Pp for indicating the physical relationship of the pieces of program information which are currently being displayed on the accumulated program section IPR with the whole program information which is under the management of the storage managing unit 107 is displayed. As a result, the user can easily recognize that accumulated programs exist above and below the programs which are being displayed, along with those which are currently being displayed on the accumulated program section IPR.

In column C234 where it is shown whether automatic erasure might be conducted or not, an unlocked key is shown when the recorded program is in a temporarily-stored state while a locked key is shown when the program is in a permanently-stored state. In the example illustrated in FIG. 17, it is shown that the program "Trip to Nature in the World No. 1," which is displayed in the row L224, is set to be in a permanently-stored state while the programs displayed in the other rows, that is, row L221, row L222, row L223, and row L225, are in temporarily-stored states.

In the accumulated program section IPR, a program for which so-called "chase viewing," which means recording a program which is being broadcast and meanwhile playing back an arbitrary portion already recorded at the same time, is being performed is not displayed. This is because, in the case of the process of chase viewing, not only a program which has already been recorded exists in the storage managing unit 107 only when the receiving device is in a condition where chase viewing is being performed therein but also it is stored in the storage managing unit 107 so as to be separated from those which have been recorded in an ordinary manner. "Chasing state," which will be described later, is administered as the value of the storage status. Accordingly, no program in a chasing state exists when the receiving device is in a condition where the accumulated program section IPR as illustrated in FIG. 17 is displayed thereon.

The display unit 104 is an output device for presenting information to a user. The display unit 104 converts output from the UI controlling unit 103 to a physical phenomenon which is perceivable by the user and presents it to the user. The display unit 104 is, for example, composed of a CRT (Cathode Ray Tube) display and a loudspeaker.

The input unit 105 is a device for inputting a physical operation by the user. The input unit 105 is composed of a pointing device such as a remote controller, a keyboard, and a mouse and/or a human interface device typified by a speech recognition device. Based on an instruction by the user, the input unit 105 generates an operation input signal So and outputs it to the UI controlling unit 103.

The program list managing unit 106 receives information of a program list outputted from the receiving unit 101 and creates a database of the program list. The program list managing unit 106 may be any as long as it is provided with a decoding program for an electronic program list (EPG; Electric Program Guide) in a digital broadcast tuner and its execution environment.

The storage managing unit 107 stores one or more pieces of program data composed of video data, audio data, and the like and outputs them in accordance with a request from the outside. Note that storing program data means recording a program, in other words.

In the storage managing unit 107, in addition to program data Dp, program storage information RDp for managing a plurality of pieces of program data which have been stored is stored as well. The program storage information RDp includes a list of programs whose program data Dp is stored in the storage managing unit 107 and information which shows the date and time when the programs were recorded, the broadcast channels on which the programs are delivered, the titles of the programs, and the storage states of the programs. Information showing the storage state of program data Dp has, for each of the programs which have been stored, one of the values which indicate three states. The three states are, specifically, a temporarily-stored state, a permanently-stored state, and a chasing state.

The temporarily-stored state indicates that program data Dp which has been recorded is permitted to be automatically erased when the capacity of the storage managing unit 107 is insufficient. The permanently-stored state, which is a regular state, indicates that program data Dp is permanently stored unless an explicit erasing operation is conducted by the user. The chasing state indicates that it is program data that is temporarily created during chase viewing, which will be described further below.

The chasing unit 108 realizes the "chase viewing" function in the receiving device 1200. Here, chase viewing is described. An object of this function is, in a situation where the user is viewing in real time a program which is currently being delivered or broadcast, to provide a situation typified by viewing, in non-real time for broadcast, a scene of the program which has been missed for a reason like leaving the seat for going to the bathroom or the like.

In order to do chase viewing, the user at first starts the recording of a program which is being viewed by pressing a "pause" button of the input unit 105 realized by a remote controller or the like when he or she leaves the seat. When the user returns to the seat after awhile, if he or she presses a "chasing playback" button of the input unit 105, the recorded program is played back from the time point at which the "pause" button was pressed earlier. At this time, the playback of the program recorded during the time when he or she was away from the seat and the recording of scenes which cannot be presented to the display unit 104 to be viewed because of the playback of scenes being performed at the moment are performed at the same time.

A chase viewing operation in the receiving device 1200 is described. Chase viewing is realized by the chasing unit 108 controlling the storage managing unit 107, the program decoder 102, and the UI controlling unit 103. The preprogrammed recording unit 109 manages the preprogramming of the recording of a program and causes the recording to be carried out as preprogrammed. Based on program list information IP inputted from the program list managing unit 106 and an operation signal So inputted from the input unit 105, the preprogrammed recording unit 109 generates program identification information IPTR for identifying a program to be recorded.

The program identification information IPTR includes information indicating the starting date and time (hereinafter referred to as "a program-to-be-recorded starting time TSS"), ending date and time (hereinafter referred to as "a program-to-be-recorded ending time TTS"), and a broadcast channel (hereinafter referred to as "a program-to-be-recorded broadcast channel CB) of a program to be recorded, for example.

The preprogrammed recording unit 109 compares a present date and time (hereinafter referred to as "a present time TC") with the program-to-be-recorded starting time TSS which is indicated by the held program identification information IPTR, and, if both coincide with each other, in connection with the receiving unit 101, requests the receiving unit 101 to receive broadcast data which is delivered through (broadcast on) the broadcast channel indicated by the program-to-be-recorded broadcast channel CB and causes the storage managing unit 107 to record and store program data Dp outputted by the receiving unit 101. Concerning this chase viewing operation, a description in detail is made later with reference to FIG. 19.

Next, with reference to FIG. 18, automatic erasure recording in a conventional receiving device is described. Automatic erasure recording refers to a function of automatically securing, in the storage managing unit 107, a vacant area necessary for storing data of a program to be recorded when carrying out a recording. Specifically, if the storage managing unit 107 does not have a sufficient vacant area necessary for a recording which is about to be carried out, one or more pieces of the program data Dp already recorded in the storage managing unit 107 are erased automatically.

Hence, automatic erasure recording is a function which becomes effective when, in a situation where one or more pieces of program data Dp have already been stored in the storage managing unit 107, an instruction to record at least one program is further given. In such a situation, when an instruction to record a program is given, the automatic erasure recording function begins to be activated.

Then, at step S501, the preprogrammed recording unit 109 compares the present time TC with the program-to-be-recorded starting time TSS based on the program identification information IPTR, and determines whether the preprogrammed recording starting time is reached or not. Until the present time TC reaches the program-to-be-recorded starting time TSS, the preprogrammed recording unit 109 repeats the processing of the present step, and at the time when the present time TC comes to be identical to the program-to-be-recorded starting time TSS, the process proceeds to the next step S1301.

At step S1301, the storage managing unit 107 erases, among the stored program data Dp, a part or whole of the data which is in a temporarily-stored state and thereby secures a vacant area sufficient for storing the program data Dp which the preprogrammed recording unit 109 has given an instruction to record. However, in the case where a vacant area sufficient for storing the program data of which an instruction of recording has been given has been secured in the storage managing unit 107, the erasure of program data Dp is not carried out. The selection criterion for determining which is to be preferentially erased of the program data Dp in a temporarily-stored state is arbitrarily determined considering the user's preference: for example, to select in the order of the date and time of recording or to preferentially select one which has already been played back. After the processing of the present step, the process proceeds to the next step S510.

At step S510, the storage managing unit 107 creates a new recording file. A new recording file refers to a data area in which to store a program which the preprogrammed recording unit 109 is to record. Then, the process proceeds to the next step S505.

At step S505, the recording of a program which has been preprogrammed is caused to begin. Specifically, data of a program to be stored is outputted from the receiving unit 101 to the storage managing unit 107 by the preprogrammed recording unit 109 instructing the receiving unit 101 of a broadcast channel (recording program broadcast channel CB) on which reception should be made, and next a preprogrammed recording is caused to begin by instructing the storage managing unit 107 to store the output from the receiving unit 101.

Next, with reference to FIG. 19, chase viewing process is described. Chase viewing is a function which is realized by conducting a recording and a playback at the same time. Therefore, by the user pressing a pause button of the input unit 105 in a situation where the recording of a program for which chase viewing is to be performed has already been caused to begin, the operation of chase viewing is caused to begin.

Therefore, at step S701, it is determined whether a pause instruction by the user has been inputted. Note that a pause instruction by the user is, after being outputted from the input unit 105 as a user input signal So, notified to the chasing unit 108 via the UI controlling unit 103. The chasing unit 108 repeats the processing of the present step until the user presses the pause button of the input unit 105. When the user presses the pause button, a pause instruction is detected, and the process then proceeds to the next step S702.

At step S702, the chasing unit 108 causes the storage managing unit 107 to create a new recording file. This new recording file is furnished for the chasing process which will be described later. Then, the process proceeds to the next step S703.

At step S703, the recording of program data Dp of a program which is currently being viewed is caused to begin by the chasing unit 108 with the recording file which has been created at step S702. In starting a chasing playback, it is possible to conduct a playback, while utilizing this recording file, from the point at which the recording is caused to begin at the present step. Thus, the chasing unit 108 operates without recognizing a program. Consequently, if a pause instruction has been maintained for a long time, for example, a chasing process may be performed for two different consecutive programs. Then, the process proceeds to the next step S704.

At step S704, it is determined whether a chasing playback instruction has been inputted by the user. In other words, until the user presses the chasing playback button of the input unit 105, the process stays at the present step S704, and when the chasing playback button is pressed, the process proceeds to the next step S705.

At step S705, the new recording file to which the recording was caused to begin at step S703 starts to be played back from the beginning. In other words, the playback is started, going back in time from the time point when the user presses the chasing playback button at step S704 to the time point when the recording was caused to begin at step S703 in response to an operation of the pause button by the user at step S701. Note that, at this time point, the concurrent operation of the recording to and the playback of one recording file, started at step S703 and step S705 respectively, is caused to begin. Then, the process proceeds to the next step S706.

At step S706, it is determined whether a chase finishing instruction by the user has been inputted. In other words, if the user has pressed the chase finishing button of the input unit 105, the process proceeds to step S707, and if he or she has not pressed the chase finishing button, the process proceeds to step S708. Note that the chase finishing button has a function of sending a command signal which gives an instruction for finishing a chasing process in execution.

At step S707, the chasing playback process in the chase viewing which is in execution at the moment is forcibly terminated by the chasing unit 108. Then, the process proceeds to the next step S1401.

At step S1401, the recording process in the chase viewing which is in execution at the moment is forcibly terminated by the chasing unit 108. Then, the process proceeds to the next step S1402.

At step S1402, the recording file which was created at step S702 and to or from which program data was recorded and read thereafter is erased. Then, the process is finished.

At step S708, it is determined whether the chasing playback started at step S705 has already been completed. If it is determined that it has not been completed, the process returns to step S706 described above. Meanwhile, if it is determined that it has been completed, the process proceeds to step S1402 described above and the recording file of which the chasing playback has been completed is erased. Thus, in a conventional device, only scenes between the point at which the playback is being performed and the point at which the recording is being performed is stored in a recording file. A recording file may be managed in a data structure, a so-called ring buffer, for example.

Using a ring buffer easily makes it possible to achieve restricting the size of a recording file not to grow above a predetermined size. Consequently, the capacity of an HDD used in the storage managing unit 107 is by no means burdened aimlessly. When the playing-back position of the file catches up with the recording position of the file, the size of the recording file becomes zero. As a result, the processes corresponding to the playback finishing process at step S707 and the recording finishing process at step S1401 are automatically carried out, and therefore step S707 and step S1401 become unnecessary.

As cases where a playback position catches up with a recording file, that is, where the tail end of the recording file comes to be played back, such cases are conceivable as a case where rapid playback has been performed, a case where the recording which is currently being performed is interrupted because resources in the receiving unit which receives the program of which the recording is being performed are deprived of by another preprogrammed recording, and the like.

In the flowchart described above, an instruction to start recording is given by the pause button, but there is also a device equipped with a mode in which, whenever the power is turned on, portions up to a predetermined period behind are always recorded without necessity of pressing the pause button. Moreover, there is also a device which is structured so that when the chasing playback button is pressed the point of playback goes back a predetermined period of time instead of going back to the beginning of the file and if the chasing playback button is pressed repeatedly the point of playback goes back predetermined periods of time one after another.

However, the above-described receiving device has the following problems concerning operationality and functionality. First, in connection with operationality, there is a problem in an operation of preprogramming a recording of a program. Specifically, when an operation of preprogramming a recording of a program is conducted, even if an electronic program list is used, it is required to explicitly perform a preprogramming of the recording of the program, which is cumbersome. In addition, it is necessary to consider in advance which program is worthy of preprogrammed recording before the program is broadcast. Consequently, even if that one program is worth viewing is made known by another person after it is broadcast, it is no more possible to view it because it cannot be recorded any longer at the time. In connection with functionality, in terms of a chase recording for a program of which a recording is not preprogrammed, it is impossible to go back farther than to the time point at which the pause button was pressed after viewing was begun. In other words, if it is desired to record the whole of the program at the time point when a part of the program has been viewed, this is impossible without a record starting operation being performed at the starting time of the program.

Further, in the case where it is impossible to secure a sufficient vacant area in the storage managing unit 107 by erasing a part or the whole of the program data Dp which is in a temporarily-stored state by means of the above-described automatic erasure recording function, it is impossible to record a desired program. Meanwhile, even in the case where a sufficient vacant area is secured to record a new program, the user will suffer a disadvantage if an erased program which has been in a temporarily-stored state is preferable to the program which has been recorded newly. Not to mention, it is more disadvantageous if the erased program data has never been played back to be viewed. In view of this, it is desirable to be able to record a new program while erasing as little program data stored in the storage managing unit 107 as possible.

Therefore, an object of the present invention is to provide a speculative recording function device which performs a speculative recording which automatically selects a program to be recorded in view of the history of viewing or recording and the like, even when an explicit recording instruction is not given by the user. Further, another object is to provide a speculative recording function device which speculatively secures an area for a new recording of a program while erasing as little program data which has already been recorded as possible.

SUMMARY OF THE INVENTION

The present invention has the following features to attain the objects described above.

According to a first aspect, included are:

a profile extracting unit for extracting a user profile which indicates a preference of a user's in viewing programs based on an operation by the user;

a program list managing unit for acquiring attributes of a program;

a speculation selecting unit for selecting a program to be speculatively recorded based on the user profile and the attributes of the program;

a storage managing unit for accumulating program data; and a speculative recording managing unit for erasing the program data accumulated in the storage managing unit when necessary and for recording program data selected by the speculation selecting unit.

According to a second aspect based on the first aspect, the program data accumulated in the storage managing unit is in either one of a temporarily-stored state and a permanently-stored state; the speculative recording managing unit erases, among the program data accumulated in the storage managing unit, a piece of program data in the temporarily-stored state when necessary, and records program data selected by the speculation selecting unit in the temporarily-stored state; and a user interface controlling unit for converting the state of program data accumulated in the storage managing unit between the temporarily-stored state and the permanently-stored state in accordance with a request from the user is included.

According to a third aspect based on the second aspect, a chasing unit for, after beginning a process of accumulating a currently-broadcast program into a file in the temporarily-stored state from a record starting timing to an end of the program, beginning to play back the file at a playback starting timing is further included.

According to a fourth aspect based on the first or second aspect, the user interface controlling unit inputs a record starting timing and a playback starting timing from the user, and a chasing unit for, after beginning a process of accumulating a currently-broadcast program into a file in a temporarily-stored state from the record starting timing to an end of the program, beginning to play back the file at the playback starting timing is included.

According to a fifth aspect based on the second aspect, a communication unit for communicating with a network connected with one or more remotely-located program recording devices is further included and when the user interface controlling unit performs an operation of converting a state of a piece of program data selected by the user from among programs accumulated by the remotely-located program recording devices and the program data accumulated in the storage managing unit into the permanently-stored state in accordance with a request from the user while utilizing the communication unit, if the piece of program data selected by the user is a piece of program data accumulated in one of the remotely-located recording devices, the selected piece of program data is taken into the storage managing unit via the communication unit to be converted into the permanently-stored state.

According to a sixth aspect based on the fifth aspect, when there is a program data file which is program data accumulated in one of the remotely-located program recording devices and which is a program data file of a program identical to a currently-broadcast program to be accumulated by the chasing unit, the chasing unit starts, by utilizing the communication unit, playing back the program data file of the identical program at the playback starting timing.

According to a seventh aspect based on the sixth aspect, the chasing unit starts playing back the program data file of the identical program at the playback starting timing and, at a time point of the record starting timing or later, changes the played-back file to a file conducted for the storage managing unit.

BRIEF DESCRIPTION OF THE DRAWINGS

FIG. 13 is an explanatory diagram of preprogrammed recording request information created in the speculative recording device illustrated in FIG. 12.

FIG. 15 is a diagram for explaining an operation of vicarious preprogrammed recording request process by the preprogramming list managing unit of the speculative recording device illustrated in FIG. 12.

DETAILED DESCRIPTION OF THE INVENTION

First, the basic concept of a speculative recording device according to the present invention is described. In the present invention, a function is provided which infers a user's preference based on the history of viewing or recording by the user and automatically selects a program to be recorded in accordance with the inference even when an explicit recording instruction is not given by the user. For that purpose, speculative recording, which is a function of a recording device which automatically records a program which the user is likely to desire to record or a receiving device itself incorporating such a recording device selecting and recording a program, is realized. The selection by the recording device, which does not always accord with the desire of the user's, has an aspect of "speculation" because a recording which is performed as a result thereof may prove to be a worthless recording. In this sense, the function of recording a specific program based on the user's preference which is inferred by the present invention is called "speculative recording." Incidentally, "speculation" has been established based on a concept called "speculative execution" such as "branch prediction," which stochastically increases the entire processing speed in a high-performance microprocessor by predicting a branch and performing a reading or execution of an instruction at a following branch target in parallel with or prior to a branch instruction.

First Embodiment

With reference to FIG. 1, FIG. 2, FIG. 3, FIG. 4, and FIG. 5, a receiving device incorporating a speculative recording device according to a first embodiment of the present invention is described.

Figure 1:
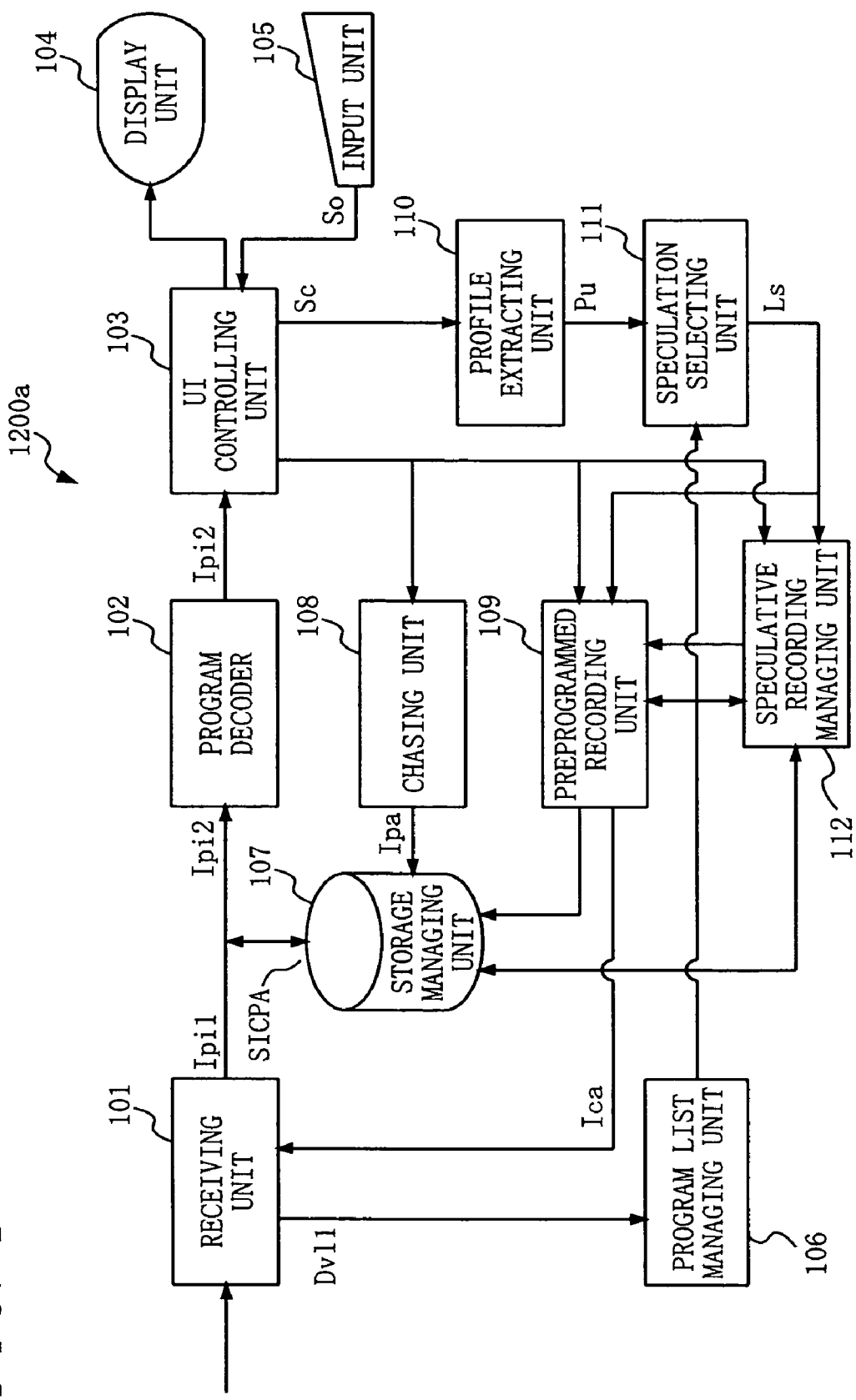
FIG. 1 is a block diagram illustrating a typical example of a receiving device incorporating a speculative recording device according to a first embodiment of the present invention.

As is shown in FIG. 1, a receiving device 1200a according to the present embodiment has such a structure such as a profile extracting unit 110, a speculation selecting unit 111, and a speculative recording managing unit 112 are added to the aforementioned conventional receiving device 1200. The profile extracting unit 110 is connected with the UI controlling unit 103 and monitors, as appropriate, the state of a transition control signal Sc outputted from the UI controlling unit 103 and the state of the user's operation of the input unit 105 (an input by the user). Then, based on the monitored state of operation, it extracts information characterizing the user's preference, and creates a user profile Pu. Note that the profile extracting unit 110 updates, as appropriate, the once-created user profile Pu in accordance with a monitored state.

The user profile Pu is a set of data directly or indirectly indicative of the user's preference. It is a set of information indicating each user's preference obtained by performing a statistical process concerning, for example, a particular program broadcast in real time being viewed repeatedly, which of the programs recorded in a temporarily-stored state has been stored permanently, or which of the programs recorded in a temporarily-stored state has been viewed or automatically erased without being viewed. Various types of models or data structures can be adopted for such a user profile.

The speculation selecting unit 111 selects, based on a user profile Pu outputted from the profile extracting unit 110, a program which it is determined the user will desire to view and which is potentially to be speculatively recorded from the programs shown in program list information IP outputted from the program list managing unit 106, and creates a potentially-to-be-speculatively-recorded program list LS.

Based on the potentially-to-be-speculatively-recorded program list LS outputted from the speculation selecting unit 111, the speculative recording managing unit 112 instructs the storage managing unit 107 to perform recordings in the order of the broadcast starting time of the programs to be speculatively recorded which are included in the potentially-to-be-speculatively-recorded program list LS.

Figure 2:
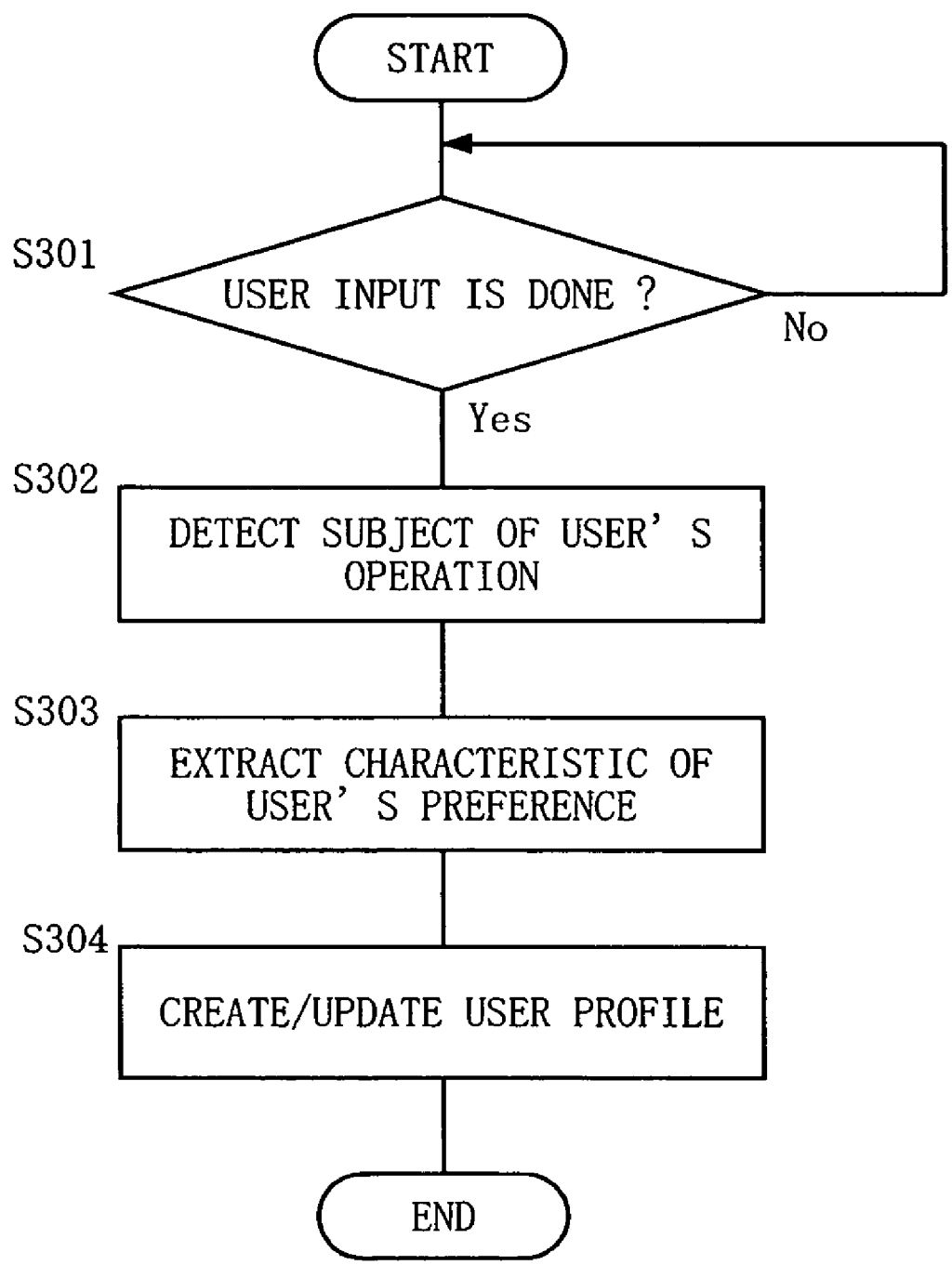
FIG. 2 is a flowchart showing a user profile creating operation by the receiving device illustrated in FIG. 1.
Figure 3:
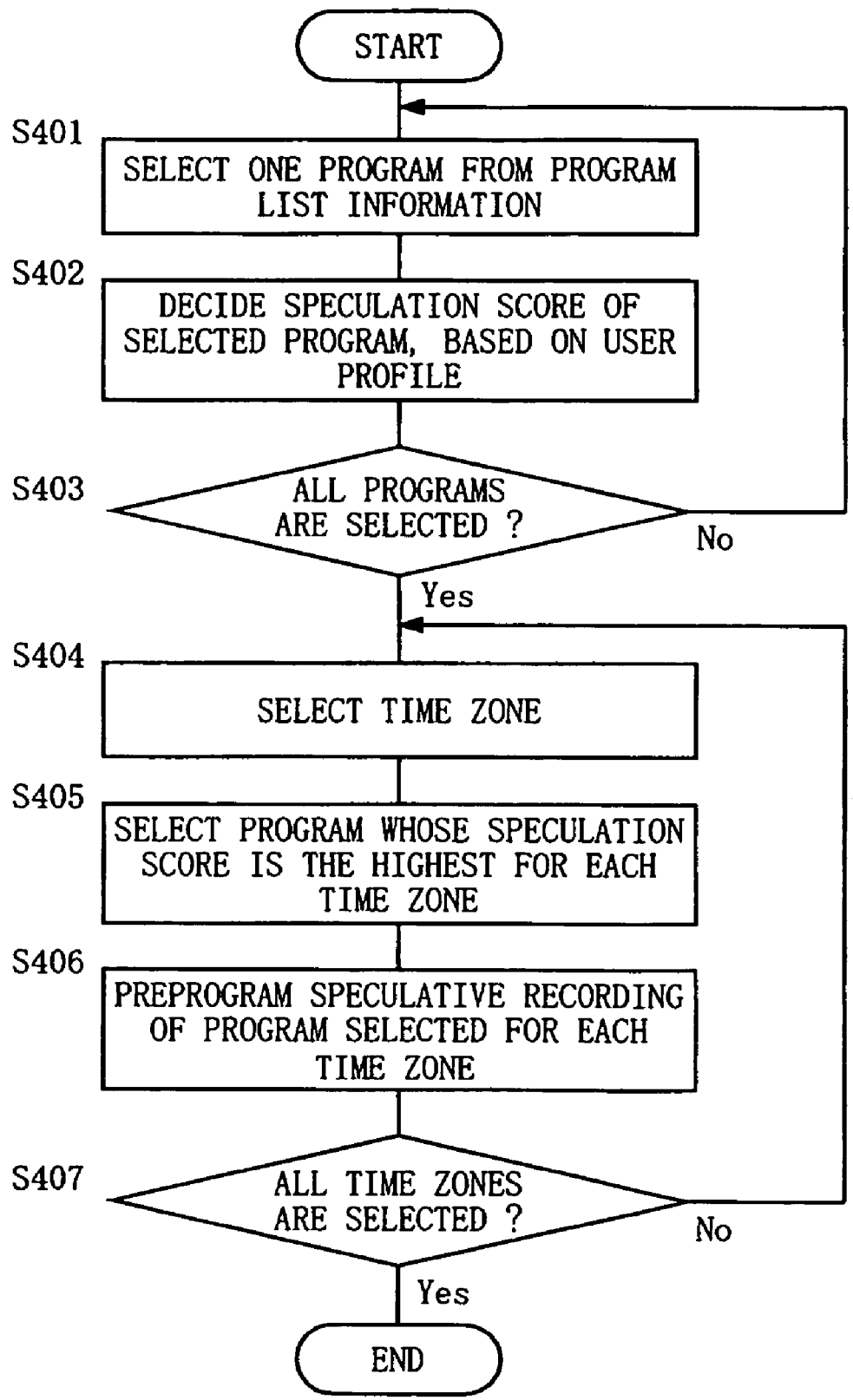
FIG. 3 is a flowchart showing a speculative recording preprogramming operation by the receiving device illustrated in FIG. 1.
Figure 4:
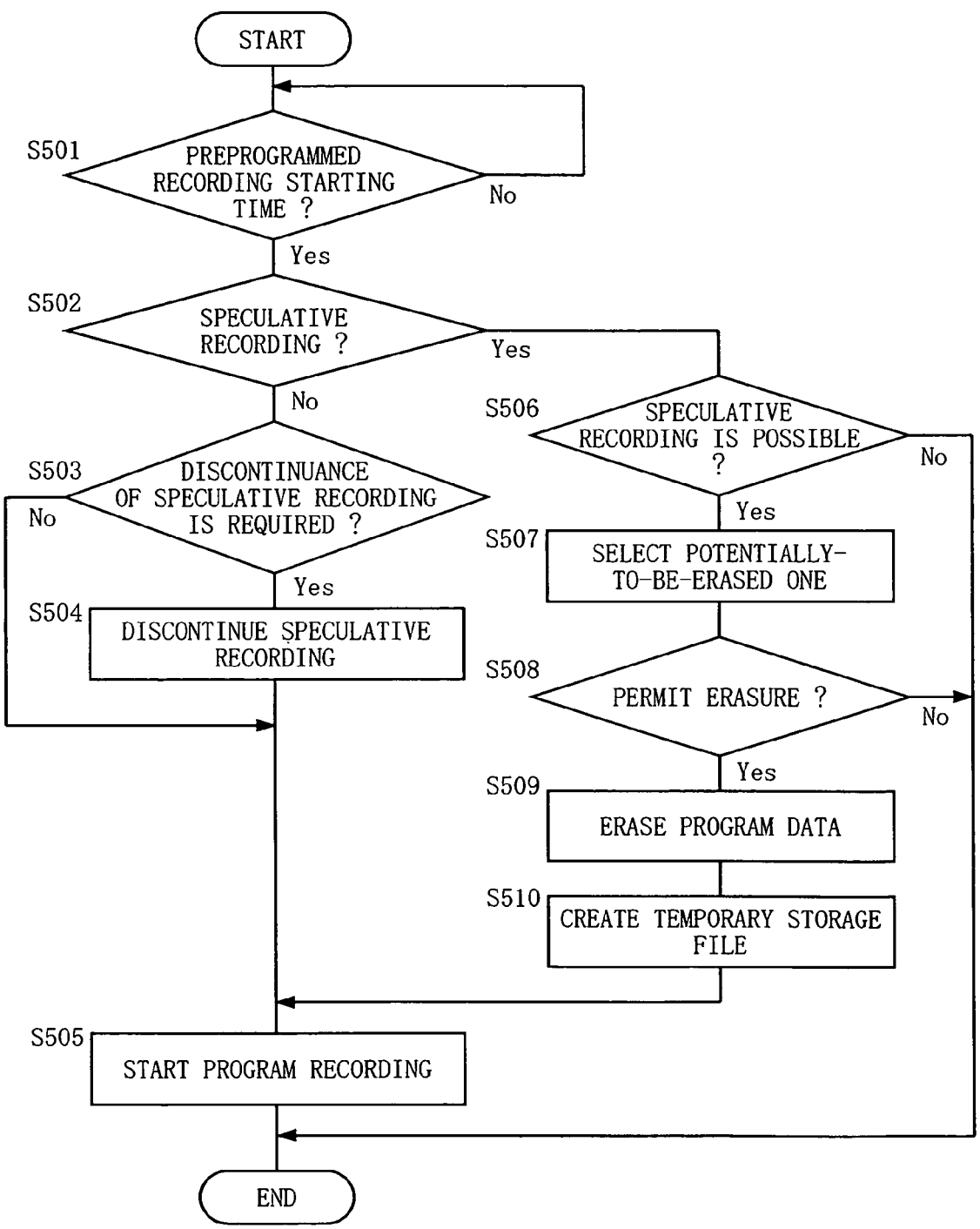
FIG. 4 is a flowchart showing a speculative recording operation by the receiving device illustrated in FIG. 1.

In connection with the aforementioned receiving device 1200a, a speculative recording operation is described in detail, with reference to FIG. 2, FIG. 3, and FIG. 4, while focusing on the creation of a user profile Pu and a speculative recording preprogramming (the creation of a potentially-to-be-speculatively-recorded program list LS), which are its characteristic features.

First, with reference to FIG. 2, the creation and update of a user profile in the receiving device 1200a is described. As described above, a user profile Pu is a set of information which characterizes a user's preference toward programs which has been extracted based on the user's operation of the input unit 105. Consequently, at the time when the user operates the input unit 105 the creation of a user profile begins.

That is, at step S301, it is determined whether the user has operated the input unit 105 based on an operation signal So. Until an operation by the user is detected the determination process at the present step is repeated, and at the time when an operation by the user is detected the process proceeds to the next step S302.

At step S302, the UI controlling unit 103 detects the subject of the user's operation based on an operation signal So and generates a transition control signal Sc. Then, the process proceeds to the next step S303.

At step S303, the profile extracting unit 110 extracts an operation which characterizes the user's preference based on the transition control signal Sc. Specific selections have been described above. Then, the process proceeds to the next step S304.

At step S304, the profile extracting unit 110 creates or updates a user profile Pu based on the operation characterizing the user's preference which was extracted at step S303.

Next, with reference to FIG. 3, a speculative recording preprogramming routine which is executed mainly by the profile extracting unit 110, the speculation selecting unit 111, the speculative recording managing unit 112, and the preprogrammed recording unit 109 is described. A speculative recording preprogramming, as long as the receiving device 1200a is active, is activated any time and then the following processes are executed.

At the beginning, at step S401 one program included in program list information IP held by the program list managing means 106 is selected by the speculation selecting unit 111. At the same time the attributes of the selected program are acquired. The attributes of a program (hereinafter referred to as "program attributes"), which are transmitted with an electronic program list, refer to the title, cast, and genre of the program and the series of the program. Note that the program attributes may be obtained from an information source other than an electronic program list and, for example, may be obtained via a communication line. Then, the process proceeds to the next step S402.

At step S402, the speculation selecting unit 111 compares the program attributes of a program selected at step S401 with a user profile Pu held by the profile extracting unit 110. Then, based on the degree of conformity between the program attributes and the user profile Pu which were compared with each other, an extent to which the selected program should be speculatively recorded is estimated and then a speculation score Ps is created. It is assumed that a speculation score Ps increases as the degree of conformity increases. In addition, the speculation selecting unit 111 temporarily stores the speculative score Ps for each program obtained at the present step. Then, the process proceeds to the next step S403.

At step S403, it is determined whether all the programs included in the program list information IP have been selected (step S401). If the result is No, processes at steps S401 and S402 described above are repeated and the speculation score Ps for each program included in the program list information IP is estimated one after another. At the time when the speculation scores Ps for all the programs included in the program list information IP have been estimated, the determination of Yes is made at the present step and the process proceeds to the next step S404. In this manner, the speculation selecting unit 111 temporarily stores the speculation scores Ps for the respective programs as speculation scores PsA.

At step S404, a time zone in which programs exist on the electronic program list is selected by the speculation selecting unit 111. The selection range of a time zone may accord with a unit period according to the drawing-up of a program. If it is assumed that the minimum unit of the drawing-up of a program is separated at-on the hour and on the half hour, for example, a time zone may be selected in units of 30 minutes. Then, the process proceeds to the next step S405.

At step S405, with regard to time zone selected at step S404, the program whose speculation score Ps is the highest of those of the programs included in the time zone is selected by the speculation selecting unit 111. Then, the process proceeds to the next step S406.

At step S406, a potentially-to-be-speculatively-recorded program list LS is outputted from the speculation selecting unit 111 to the speculative recording managing unit 112. (Specifically, a potentially-to-be-speculatively-recorded program list LS includes the starting date and time, ending date and time, broadcast channel, speculation score Ps of a program selected at step S405.) Then, the speculative recording managing unit 112 generates, based on the potentially-to-be-speculatively-recorded program list LS inputted from the speculation selecting unit 111, speculative recording instructing information IRs and outputs it to the preprogrammed recording unit 109. The speculative recording instructing information IRs includes, of a starting date and time, an ending date and time, a broadcast channel, and a speculation score Ps included in the potentially-to-be-speculatively-recorded program list LS, the starting date and time, the ending date and time, and the broadcast channel. A speculative recording preprogramming based on the speculative recording instructing information IRs is set by the preprogrammed recording unit 109. Then, the process proceeds to the next step S407.

At step S407, it is determined whether all time zones have been selected. If the result is No, processes at steps S404, S405, and S406 described above are repeated, during which the speculative recording preprogramming of a program which has the highest speculation score PSmax(tz) in a time zone different from that of the immediately previous time is performed. Then, at the time when the speculative recording preprogrammings have been performed for all time zones (tz), the determination of Yes is made at the present step and the speculative recording preprogramming routine is finished.

Next, with reference to FIG. 4, the speculative recording performing routine carried out mainly by the storage managing unit 107 and the speculative recording managing unit 112 is described. The present speculative recording performing routine is premised on a speculative recording having been preprogrammed by the above-described speculative recording preprogramming routine. Consequently, first, at step S501, it is determined whether the present time Tc corresponds to any one of the record starting times Tr of all the programs of which the preprogrammed recordings have been set at step S406 described above. After repeating the process of the present step until the determination of Yes is made, the process proceeds to the next step S502.

At step S502, it is determined whether a program of which the recording is set to be performed at the present time Tc, which it has been detected at step S501 corresponds to the record starting time Tr thereof, is a program for which a speculative recording preprogramming was performed at step S406 described above. If an ordinary record preprogramming has been made for the record starting time Tr, the process proceeds to step S503. Note that "an ordinary record preprogramming" refers to a preprogramming operation which is carried out by the user inputting the broadcast date and time and channel of a program which were selected and learned from a program list, or the like. This means that the program has been selected by an operation which is based on an explicit request of the user himself or herself, that he or she wants to record that particular program.

In the case of Yes, that is, in the case where a speculative recording has been preprogrammed for the record starting time Tr, the process proceeds to step S506. Note that the determination as to whether it is a speculative recording or not is preferably made by the speculative recording managing unit 112. Specifically, the preprogrammed recording unit 109 can easily determine whether it is a speculative recording or not by a bit indicating it is a speculative recording being added to the speculative recording instructing information IRs, which the speculative recording managing unit 112 outputs to the preprogrammed recording unit 109, at step S406 described above.

At step S503, it is determined by the speculative recording managing unit 112 whether an ordinary preprogrammed recording whose record starting time Tr has been reached can be carried out in the present condition of the resources of the receiving device. In the case where, in the present condition of the resources, the execution of the preprogrammed recording is impossible, if any speculative recording is being performed at the moment, it is determined that the execution thereof is stopped. That is, at the present step, it is determined based on the condition of the resources of the receiving device 1200a whether the discontinuance of a speculative recording which is being performed is required or not to perform an ordinary preprogrammed recording. If it is determined that the discontinuance of the speculative recording which is being performed is required, the process proceeds to the next step S504. Note that the resources of the receiving device refers to a virtual component thereof, as which the capacity and faculty of the whole of the receiving means are regarded. For example, if the receiving means is capable of receiving only one program at the same time, a speculative recording and an ordinary preprogrammed recording cannot be performed at the same time. Besides, a situation where a plurality of recordings cannot be performed at the same time because of the lack of the faculty of the storage managing means constituted by a HDD or the like to input or output data in a unit time corresponds to a limitation of the resources.

At step S504, the speculative recording which is being performed is discontinued by the speculative recording managing unit 112. This is in order to recover the condition of the resources by forcibly terminating the speculative recording which is being performed, because it was determined at step S503 that the ordinary preprogrammed recording will not be successful unless the speculative recording which is being performed at the moment is discontinued. Then, the process proceeds to the next step S505.

Meanwhile, in the case of No at step S503 described above, that is, in the case where the preprogrammed recording can be performed in the present condition of the resources, the process skips step S503 described above and proceeds to step S505.

If it is determined as a speculative recording at step S502 described above, it is determined by the speculative recording managing unit 112 at step S506 whether the speculative recording whose record starting time Tr is reached can be performed in the present condition of the resources of the receiving device 1200a as at step S502. For example, in the case where the receiving unit 101 is capable of receiving only one program at one time, if the receiving unit 101 is in a condition where it cannot be utilized for the speculative recording due to the viewing of a real-time broadcast, an ordinary preprogrammed recording, or the like, the speculative recording cannot be performed because of the limitation of the resources. If it can be performed, the determination of Yes is made and the process proceeds to the next step S507.

At step S507, a list in which pieces of program data accumulated in the storage managing unit 107 are arranged in the ascending order of their speculation scores Ps is created by the speculative recording managing unit 112. A piece of program data which is placed high in rank in the list can be regarded as may be erased preferentially to other pieces of program data if necessary. In this sense, it may be said that the speculative recording managing unit 112 creates a potentially-to-be-erased program data list at the present step.

In the present embodiment, this potentially-to-be-erased program data list is utilized, in the case where there is not a storage area sufficient for the speculative recording of a program in the preprogrammed recording unit 109, to secure a storage area necessary for a speculative recording which is to be performed, by erasing a piece(s) of program data already stored in the order of priority which is prescribed by a predetermined condition. To achieve this purpose, at the present step, the number of programs included in the potentially-to-be-erased program data list is decided so that the total size of the program data thereof exceeds by a predetermined amount the size of the area which the data of the speculatively-to-be-recorded program whose record starting time Tr has been reached will cover in the storage managing unit 107. The predetermined amount is an arbitrary value to be decided considering the operational quality of the storage managing unit 107 and the like, to record the whole of the program for which the preprogramming was made. The speculation scores Ps of the programs which were utilized when the potentially-to-be-erased program data list was created may be stored as respective program attributes in the storage managing unit 107, or alternatively, the speculative recording managing unit 112 may manage them in a lump in connection with the speculatively-recorded programs which have already been accumulated as well.

At step S508, it is determined by the speculative recording managing unit 112 whether the speculation scores Ps of all the program data included in the potentially-to-be-erased program data list are lower than the speculation score Ps of the program to be speculatively recorded. Note that, as has already been described above, the total amount of the program data included in the potentially-to-be-erased program data list corresponds to a capacity necessary for storing the data of the program which is to be speculatively recorded. If the determination of Yes is made, the process proceeds to the next step S509.

At step S509, all the program data included in the potentially-to-be-erased program data list is erased by the speculative recording managing unit 112. As a result, a vacant area which enables the program to be speculatively recorded to be stored is produced. Then, the process proceeds to the next step S510.

At step S510, a new recording file is created in the storage managing unit 107. This file is set in a temporarily-stored state for the speculatively-to-be-recorded data. Then, the process proceeds to the next step S505.

At step S505, the recording of the program whose record starting time Tr has been reached is caused to begin by the preprogrammed recording unit 109. Then, the process is finished.

Note that, in the case where it is determined that a speculative recording cannot be performed because of the condition of the resources, the determination of No is made at step S506 described above, the processes of steps S507, S508, S509, S510, and S505 described above are skipped, and the present routine is finished. This is based on the idea that a function which is activated by an operation based on an explicit request of the user's such as a real-time broadcast viewing or an ordinary preprogrammed recording should not be prevented by a speculative recording by the receiving device 1200, which is not based on an explicit intention of the user. Note that it is also based on the same idea that a speculative recording which is being performed is discontinued at step S504 if the determination of Yes is made at step S503.

Note that, in the present embodiment, on the condition that the speculation scores Psd of all the programs included in the potentially-to-be-erased program data list are lower than the speculation score Psr of the program data to be speculatively recorded at step S508, all of the potentially-to-be-erased program data is erased to secure the storage area for the speculatively-to-be-recorded data. However, of the potentially-to-be-erased program data, only a piece(s) thereof whose speculation score(s) Psr is lower than the speculation score Psd of the program data to be speculatively recorded may be erased to record only part of the program to be speculatively recorded, as long as possible.

Note that, instead of securing a vacant area which enables the whole of the speculative recording to be stored (S509) before starting a speculative recording (S505), it is easy to devise a structure so that every time an area in the storage managing unit 107 runs short, a program whose speculation score Psd is the lowest of the programs included in the potentially-to-be-erased program data list is erased one after another. In this case, even in an emergency such as when a speculative recording is discontinued for some cause, of the program data already stored in the storage managing unit 107, only the part thereof which corresponds to the minimum area which has been required until the speculative recording is discontinued is erased. As a result, in an emergency of the discontinuance of a speculative recording the existing program data which has not been required to be erased continues to be stored, so that as large an amount of speculatively-recorded program data as can be stored in the storage managing unit 107 can be maintained. Moreover, in the case where a storage area sufficient for a speculative recording has been secured in the storage managing unit 107, the processes of steps S507, S508, and S510 described above may be omitted. Note that as examples of such an emergency, a power failure, an abrupt operation of viewing or recording by a user, and the like are conceivable.

As described above, in the present embodiment, a program which a user would desire to record is automatically recorded as far as the operation of the receiving device 1200a is not disturbed. A file of a recorded program is in a temporarily-stored state, so that at the following speculative recording it might be replaced by another piece of program data which the user would desire more (that is, whose speculation score Ps is higher) if appropriate, within the limitation of capacity. In this manner, the "speculative recording," a function of the receiving device automatically recording a program which a user would desire to record, is realized. This makes it possible to record a desired program at a high probability without the user performing a specific operation of preprogrammed recording.

Second Embodiment

In the present embodiment, a function of permanently storing program data which has been speculatively recorded, based on an instruction by a user, is added to the receiving device 1200a according to the first embodiment. Ordinary program data which has been speculatively recorded in an ordinary manner may possibly be erased automatically because of a speculative recording to be performed next time or later, but a permanent storage according to the present embodiment refers to being preserved so as not to be erased by another speculative recording.

A receiving device 1200b according to the present embodiment has the basically same structure as that of the receiving device 1200a illustrated in FIG. 1, but a function of permanently storing speculatively-recorded program data is newly added. Therefore, while the description of the structure of the receiving device 1200b according to the present embodiment is omitted for avoiding redundancy, only concerning the function of permanently storing speculatively-recorded data, a description is made with reference to FIG. 5.

Figure 5:
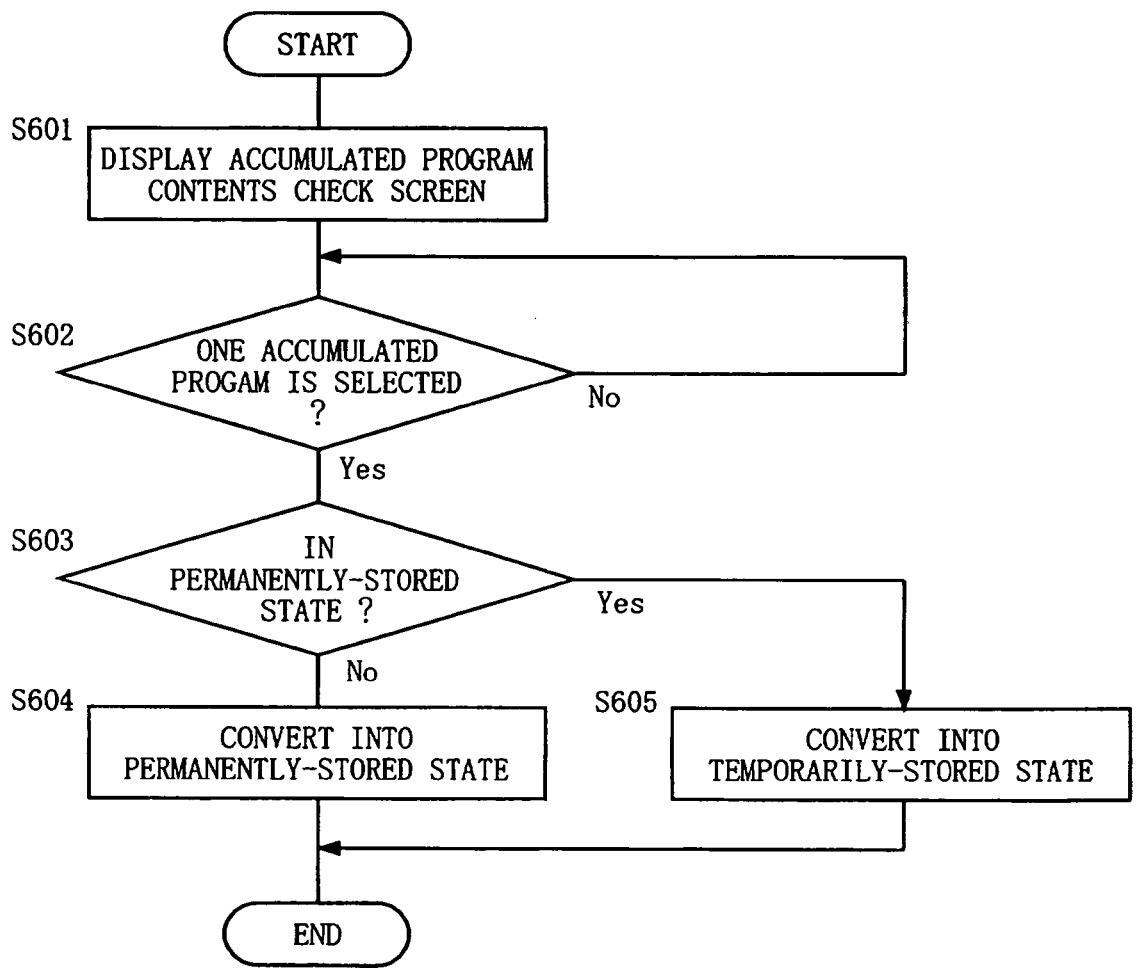
FIG. 5 is a flowchart showing an operation of permanently storing speculatively-recorded data by a receiving device incorporating a speculative recording device according to a second embodiment of the present invention.

In FIG. 5, a routine for permanently storing speculatively-recorded data carried out by the receiving device 1200b according to the present embodiment is illustrated in detail. After a speculative recording which was started at step S505 described above is finished, the present routine begins.

Figure 17:
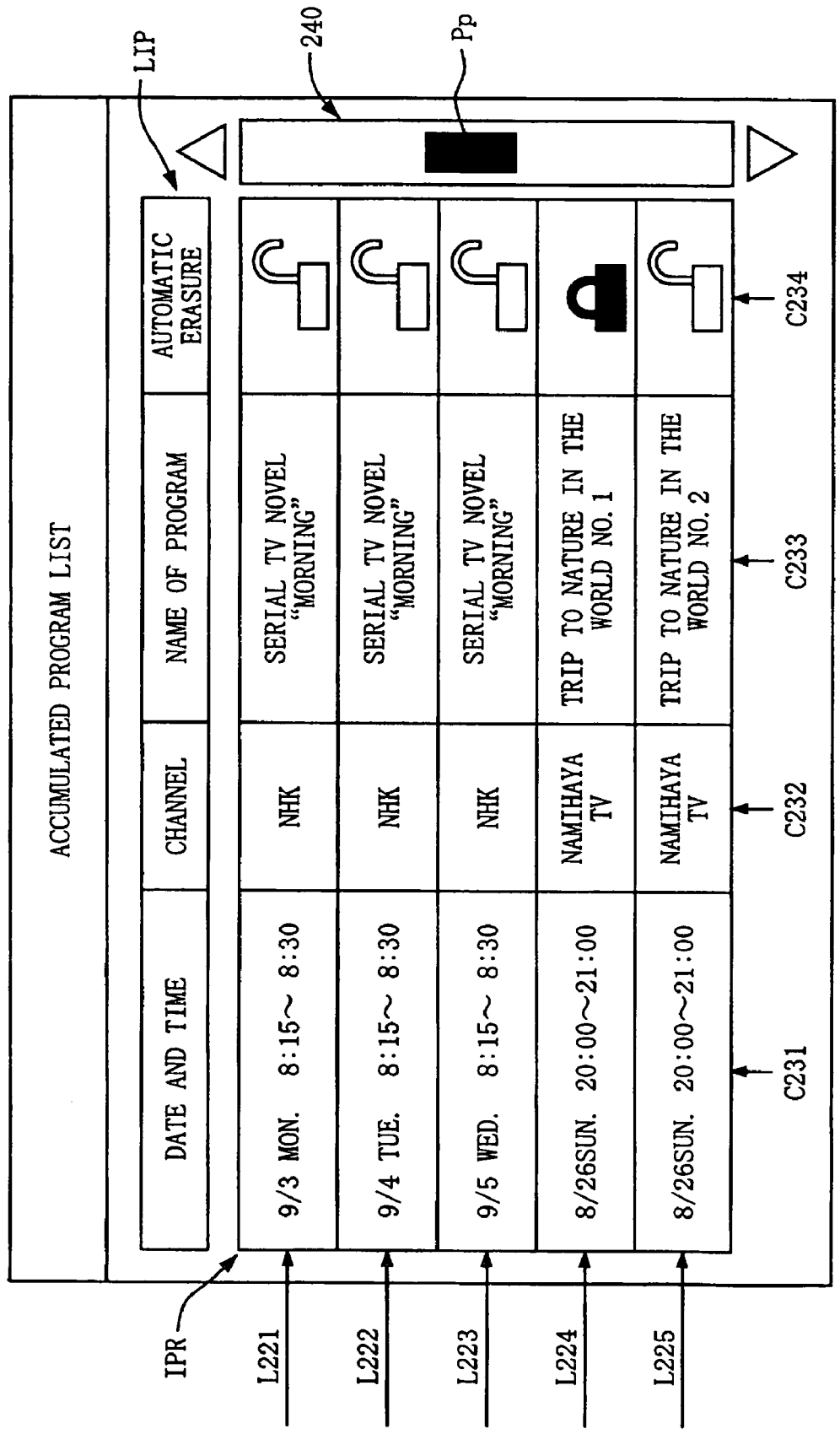
FIG. 17 is a pattern diagram illustrating an example of an accumulated contents check screen displayed on the display unit of the receiving device illustrated in FIG. 16.
Figure 18:
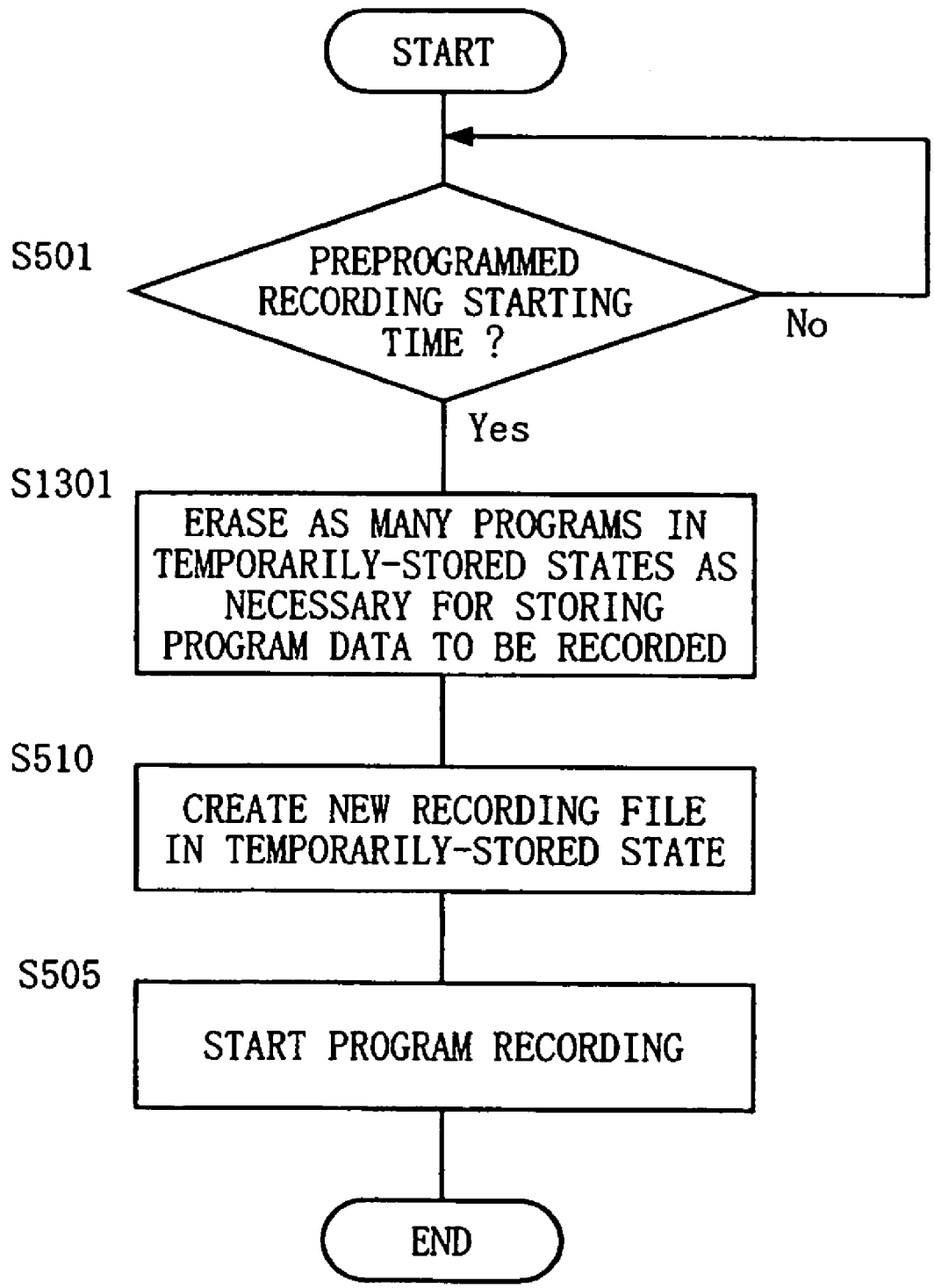
FIG. 18 is a flowchart showing an operation of automatically erasing recording data by the receiving device illustrated in FIG. 16.

First, at step S601, an accumulated contents check screen as illustrated in FIG. 17 is displayed on the display unit 104. It becomes possible for the user to select a piece of program data displayed on the accumulated contents check screen which is displayed on the display unit 104, by operating the input unit 105. Then, the process proceeds to the next step S602.

At step 8602, it is determined based on an operation signal So whether the user has selected any piece of the program data accumulated in the storage managing unit 107. At the time when the user has selected a piece of program data the determination of Yes is made, and the process proceeds to the next step S603.

At step S603, it is determined whether the piece of program data selected at step S602 is in a permanently-stored state or not. If the piece of program data is already in a permanently-stored state, the process proceeds to step S605. In the other case, that is, if the piece of program data is in a temporarily-stored state, the process proceeds to step S604.

At step S604, the program selected at step S602 is converted from the current temporarily-stored state into a permanently-stored state. Then, the present routine is finished.

At step S605, the program selected at step S602 is converted from the current permanently-stored state into a temporarily-stored state. Then, the present routine is finished.

As shown above, in the present embodiment, not only speculatively-recorded program data is stored permanently, but also speculatively-recorded program data designated by the user is converted so that it can be treated in the same manner as a program for which an ordinary preprogrammed recording was performed. By thus changing a permanently-stored state of a speculative recording to the same state as an ordinary preprogrammed recording, it becomes unnecessary to provide a specific state. As a result, it is unnecessary to complicate a screen display or a GUI (Graphic User Interface). In addition, since program data which has once got into a permanently-stored state can be treated without attention being paid in the same manner as program data for which ordinary preprogrammed recording was performed, the convenience for the user is improved. As shown above, the function which makes it possible to permanently store program data for which speculative recording was performed by an operation of the user's is realized.

Third Embodiment

In the present embodiment, a chasing function is added to the receiving device 1200a according to the above-described first embodiment. In the receiving device 1200c according to the present embodiment, program data (file) which was recorded involving a chase viewing is stored in a temporarily-stored state even after the chase viewing is finished. Moreover, even if a chasing playback is terminated before the program broadcast is completed, program data in which the whole of the program, from the beginning to the end thereof, is recorded is stored. As a result, in the case where although a program was displayed on the screen display it was not actually viewed by the user, or the like, it is possible to view it anew. Further, in the case where although he or she did not initially intend to record it he or she comes to desire to record and store it after actually viewing it, it becomes possible in a moment to permanently store the whole of the program by converting it into a permanently-stored state.

A receiving device 1200c according to the present embodiment has the basically same structure as that of the receiving device 1200a illustrated in FIG. 1, but a chase recording function in which permanent storing is enabled is added newly. Therefore, while the description of the structure of the receiving device 1200c according to the present embodiment is omitted for avoiding redundancy, only concerning the chase recording function in which permanent storing is enabled, a description is made with reference to FIG. 6.

Figure 6:
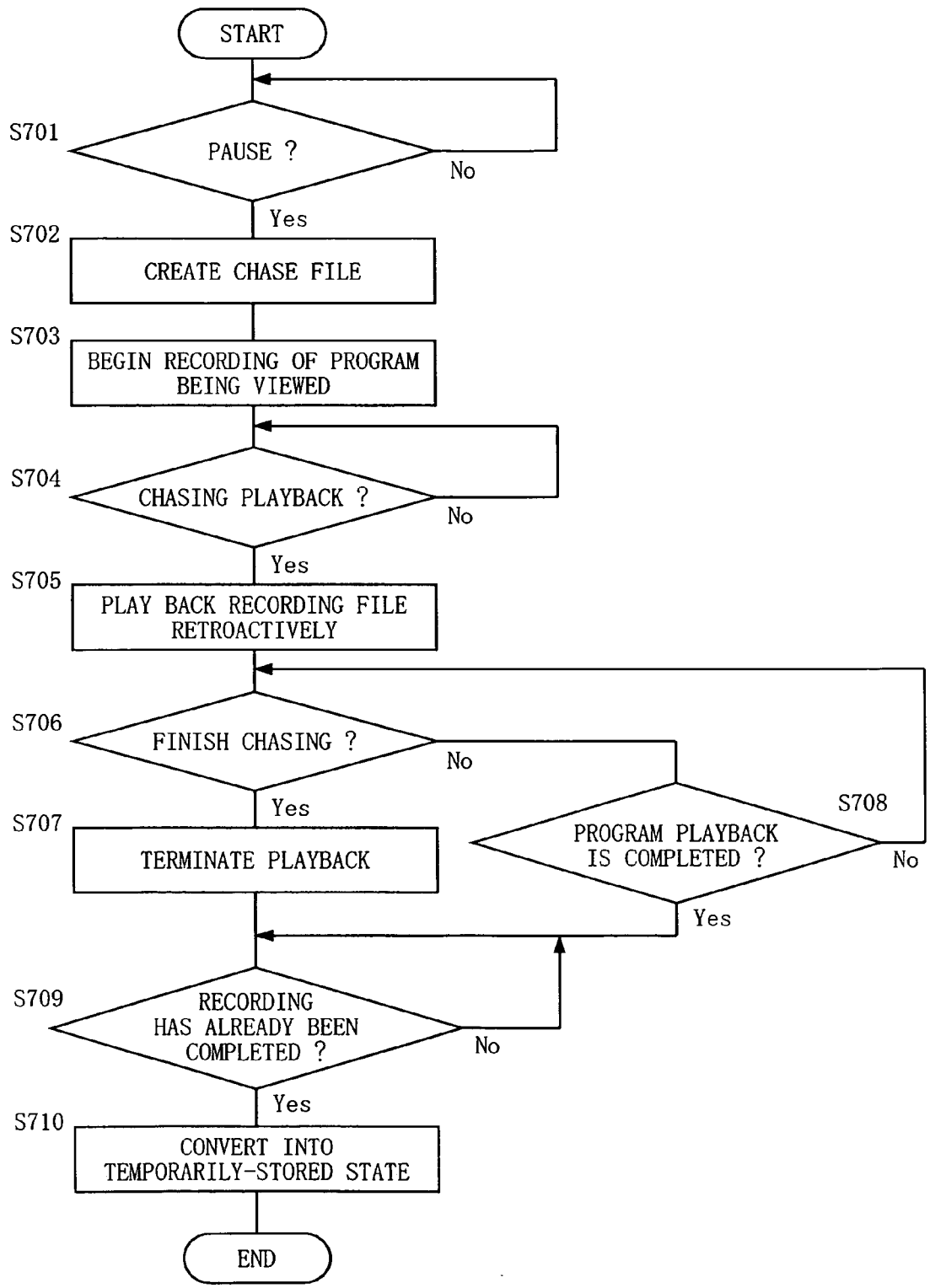
FIG. 6 is a flowchart showing a chase recording operation in which permanent storing is enabled by a receiving device incorporating a speculative recording device according to the third embodiment of the present invention.
Figure 19:
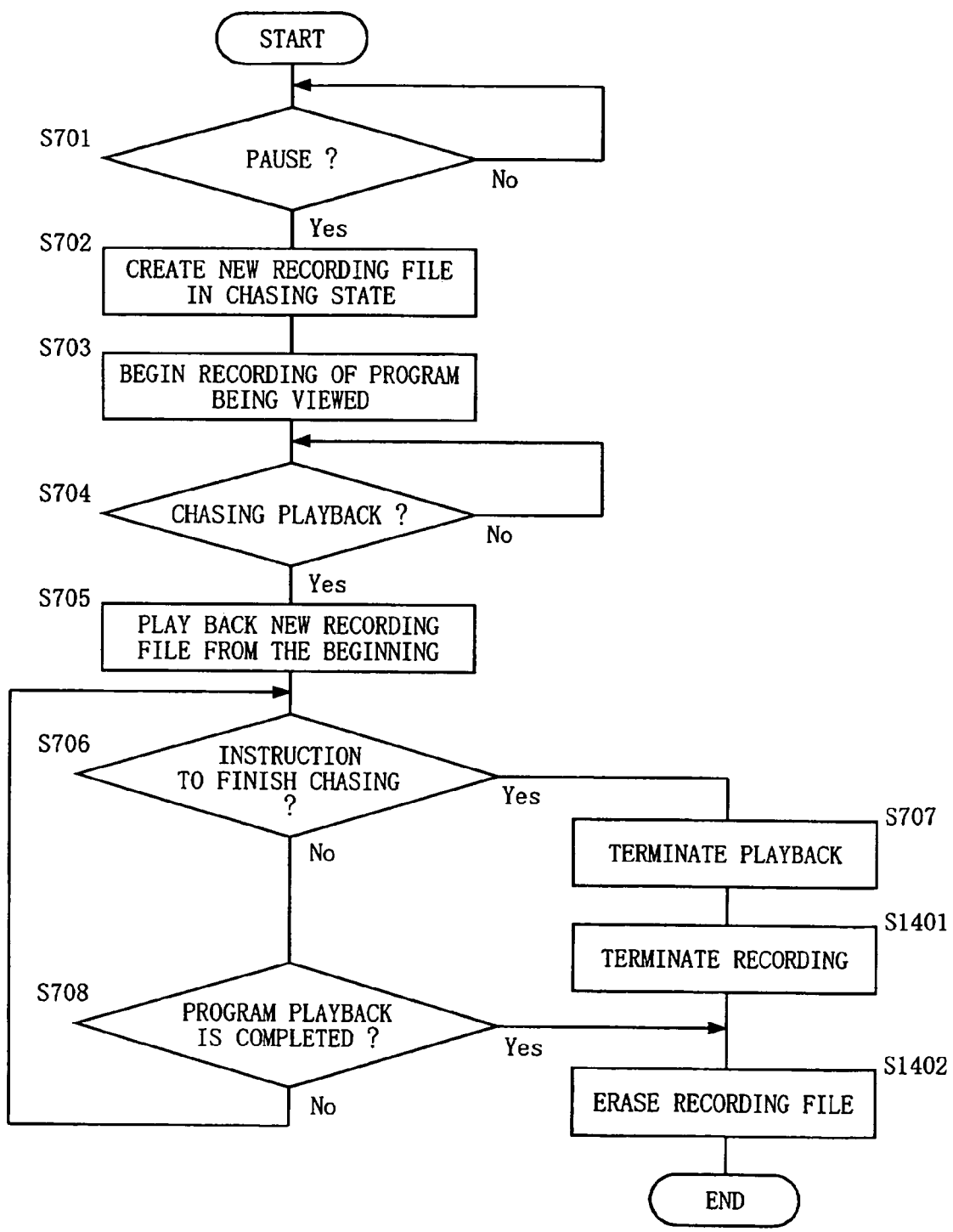
FIG. 19 is a flowchart showing a chase viewing operation by the receiving device illustrated in FIG. 16.

In FIG. 6, a routine for a chase recording in which permanent storing is enabled which is carried out by the receiving device 1200c according to the present embodiment is illustrated in detail. The chase recording routine according to the present embodiment corresponds to the chasing playback routine in the conventional technology, which has already been described with reference to FIG. 19, except that steps S1401 and S1402 are replaced by steps S709 and S710 respectively and, in addition, if the determination of No is made at step S708, the process returns to step S706. Because the steps from step S701 up to step S707 or step S708 are similar to those already described with reference to FIG. 19, a description is made concerning the processes at step S707 and thereafter, and step S708 and thereafter.

At step S707, in accordance with the detection of a chase finishing instruction from the user at step S706, the chasing playback of program data which was started at step S705 is terminated. Then, the process proceeds to the step S709.

At step S708, in a situation where no chase (recording) process terminating instruction from the user has been detected, it is determined whether the playback of a chase-recorded program which was started at step S704 has been completed or not. If the playback has not been completed, the determination of No is made and the process returns to step S706 described above. Meanwhile if the playback has been completed, the determination of Yes is made and the process proceeds to step S709.

At step S709, it is determined whether the chase recording started at step S703 has already been completed or not. After the chasing playback is forcibly terminated based on an instruction from the user (step S707) or after it is ended spontaneously (step S708), the determination of Yes is made and the process proceeds to the next step S710.

At step S710, the storage state of the chase-recorded program data (file) whose playback has been ended is converted into a temporarily-stored state. Note that in a conventional technology illustrated in FIG. 19, a chase recording is terminated as well, forcibly, at step S1401 which follows step S707. However, in the present embodiment, since a chase recording is continued until the program finishes according to the processes at step S709 and step S710, the whole of the program can be viewed anew in the future.

Note that although not specified in FIG. 6, in the present embodiment a chase recording is finished simultaneously with the end of a program broadcasting (delivery). This is because an initial setting is made at the commencement of the chase recording so that the recording is terminated at the end of the program.

Even after a recording is completed, the erasure of the file is not conducted as at step S1402 in the conventional technology, and the file is stored in the storage managing unit 107 after being converted into a temporarily-stored state at step S710. Moreover, a file preserved in a temporarily-stored state, as was described with reference to FIG. 5, can be converted into a permanently-stored state by an operation of the user's so that it is not automatically erased at a processing of speculative recording to be performed later.

Note that instead of starting a chase recording at step S702 in accordance with an operation of the pause button by-the user which is detected at step S701, recording for a chase viewing may be performed all the time. In this case, since a chase recording is performed from the beginning of a program without any operation being conducted, the program is always automatically preserved from the beginning to the end in a temporarily-stored state.

As described above, in the present embodiment, program data is not stored in a file of a form specialized for chase recording as in the case of a conventional chase viewing, but it is stored in a file of the same form as is used in both the recording modes, that is, ordinary recording and speculative recording. A file of a program which was recorded involving a chase viewing is stored in a temporarily-stored state after the chase viewing is finished. Consequently, in the case where although the program was displayed on the display screen it was not actually viewed by the user, the user can view the program later. Further, in the case where although he or she did not initially intend to record it he or she comes to desire to record and store it after actually viewing it, it becomes possible in a moment to permanently store the whole of the program by converting it into a permanently-stored state.

Fourth Embodiment

In the present embodiment, a function of utilizing a file created by a speculative recording as a file for a chase viewing is added to the above-described receiving device 1200a. This makes it possible to do a chase viewing from the beginning of a program even in the case where the program has not been viewed from the beginning. Further, because a program of which a speculative recording is performed is expected to be viewed in real time with a high probability, the probability that the chase viewing can be done from the beginning of the program is also high.

A receiving device 1200*d* according to the present embodiment has the basically same structure as that of the receiving device 1200*a* illustrated in FIG. 1, but a function of utilizing a file created by a speculative recording as a file for a chase viewing is added newly. Therefore, while the description of the structure of the receiving device 1200*d* according to the present embodiment is omitted for avoiding redundancy, only concerning the function of utilizing a file created by a speculative recording as a file for a chase viewing, a description is made with reference to FIG. 7.

Figure 7:
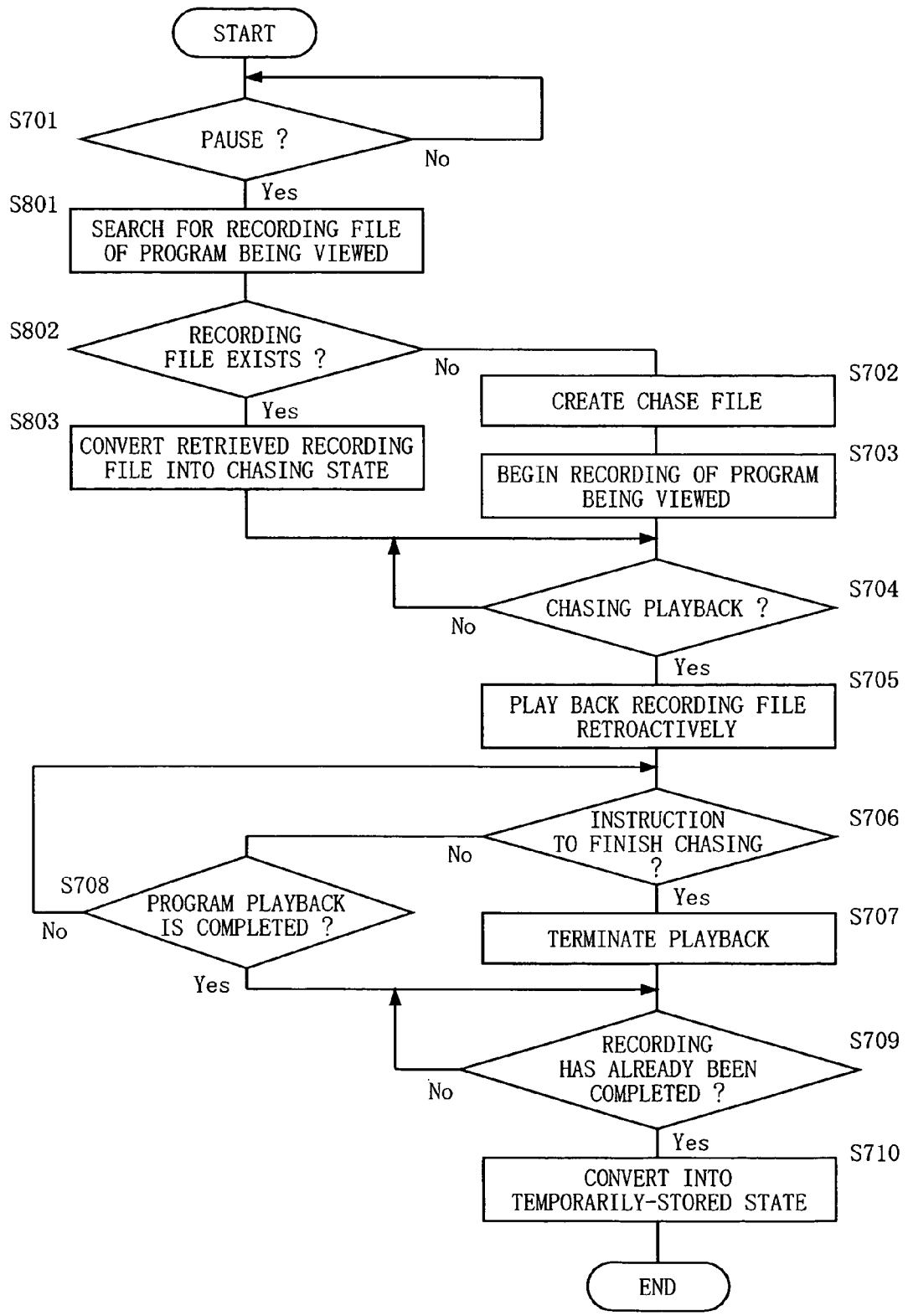
FIG. 7 is a flowchart showing a chasing operation utilizing speculatively-recorded data by a receiving device incorporating a speculative recording device according to a fourth embodiment of the present invention.

In FIG. 7, a routine for utilizing a file created by a speculative recording as a file for a chase viewing which is carried out by the receiving device 1200*d* according to the present embodiment is illustrated in detail. The chase recording routine utilizing speculatively-recorded program data according to the present embodiment corresponds to the chasing playback routine according to the third embodiment, which was described with reference to FIG. 6, except that steps S801 and S802 are newly added between step S701 and step S702, and step S803 is newly provided between this step S802 and step S704.

In the receiving device 1200*d* structured as such, as in the third embodiment, first at step S701, a chase recording process utilizing speculatively-recorded program data (file) is caused to begin by the user operating the pause button of the input unit 105. Then, the process proceeds to newly-provided step S801.

At step S801, it is determined whether the part extending up to the point which a program which is being viewed at the moment has reached has already been recorded by a speculative recording. Specifically, recording data of the program which is being viewed is searched for, and then it is determined based on the presence of the recording data (file) whether the recording has been performed or not. Note that, although the limitation to a speculatively-recorded program is assumed here, a program identical in content which was ordinarily recorded in the past may be utilized. In other words, in the case where an identical program was broadcast in the past and has already been recorded by the receiving device 1200*d* and information indicating that the program which is being viewed at the moment is the same as the recorded program is indicated by information in an electronic program list or the like, the recorded program is treated as a search result: that is, a case where the program which is being viewed at the moment is a rebroadcast of a program, which has already been recorded, or the like. Then, the process proceeds to the next step S802.

At step S802, if the result of a search at step S801 indicates that recorded program data does not exist, the determination of No is made and the process proceeds through steps S702 and S703 described above to step S704. Meanwhile, if recorded program data exists, the determination of Yes is made and the process proceeds to newly-provided step S803.

At step S803, a recording file found as a result of the search at step S801 is converted into a chasing state. And the file in a chasing state is utilized as a chase recording file. In the case where a program of which a chase viewing is to be performed has already been speculatively recorded as this, it becomes possible by treating the file for speculative recording as a file for chase recording that a chasing is performed from the beginning of the program. Moreover, since programs appropriate for the user are selected in speculative recording, a chasing from the beginning can often be performed. The process skips steps S702 and S703 described above and proceeds to step S704.

As described above, in the present embodiment, a function of utilizing a file created by a speculative recording as a file for a chase viewing is realized. Consequently, even in the case where a program has not been viewed from the beginning, it becomes possible to perform a chase viewing from the beginning of the program. Further, because a program of which a speculative recording is performed is expected to be viewed in real time with a high probability, the probability that a chase viewing thereof can be done from the beginning of the program is high.

Fifth Embodiment

In the fifth embodiment, to the above-described receiving device 1200*a* is added a function which, in the situation where it is connected as a local receiving device to the Internet at all times, makes it possible to process a program file recorded in a different, remotely-located receiving device 1200 or a server which emulates the operations of a receiving device 1200 in the same manner as a program data file which the local receiving device accumulates. This makes it possible to display recording files in a remotely-located server as a list of accumulated files on the user's local receiving device 1200*e* and copy a file from a receiving device 1200*er* at a distance or a dedicated streaming server 912 into the local receiving deice 1200*e* and store it therein in the same manner as a speculatively-recorded one in the local receiving device 1200*e* is converted into a permanently-stored state.

Figure 8:
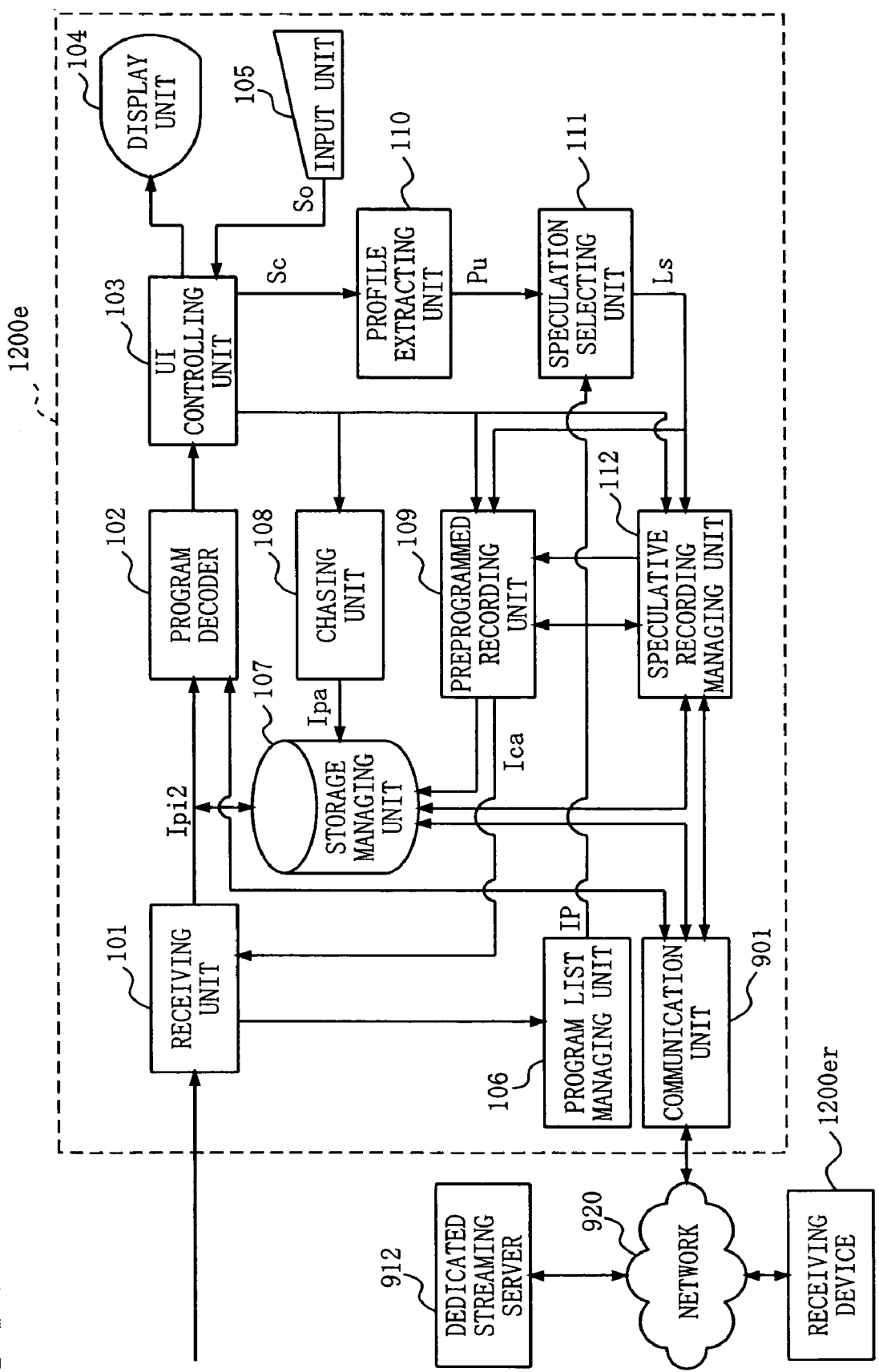
FIG. 8 is a block diagram illustrating a typical example of the structure of a receiving device incorporating a speculative recording device according to a fifth embodiment of the present invention.

In FIG. 8, a structure of the receiving device 1200*e* according to the present embodiment is illustrated. In the receiving device 1200*e*, a communication unit 901 is added to the receiving device 1200*a* according to the first embodiment illustrated in FIG. 1. Moreover, the receiving device 1200*e* is connected via a network 920 to a different receiving device 1200*er* and a dedicated streaming server 912 which emulates the operations of the receiving device 1200*e*. Needless to say, the receiving device 1200*er* may be structured in the same manner as the receiving device 1200*e*.

The communication unit 901, which performs encoding/decoding appropriate for the information transmission in the network 920, connects the receiving device 1200*e* with the network 920 and, in addition, enables communication. The communication unit 901 may be an analog modem, a broadband router, a cable modem, an interface with a LAN (Local Area Network), or the like.

A network 920 is an information transmission network which connects a plurality of receiving devices or dedicated streaming servers with one another. A network 920 may be a WAN (Wide Area Network) such as the Internet, a LAN, which is a network within a single building, or, in the case where the connections between terminals are peer-to-peer direct connections, a public switched telephone network.

The dedicated streaming server 912 appears to work in a similar manner to the different receiving device 1200*er* when observed over the network 920, but it is capable of simultaneously communicating with a plurality of receiving devices 1200*e* or 1200*er* and performing a process.

Figure 9:
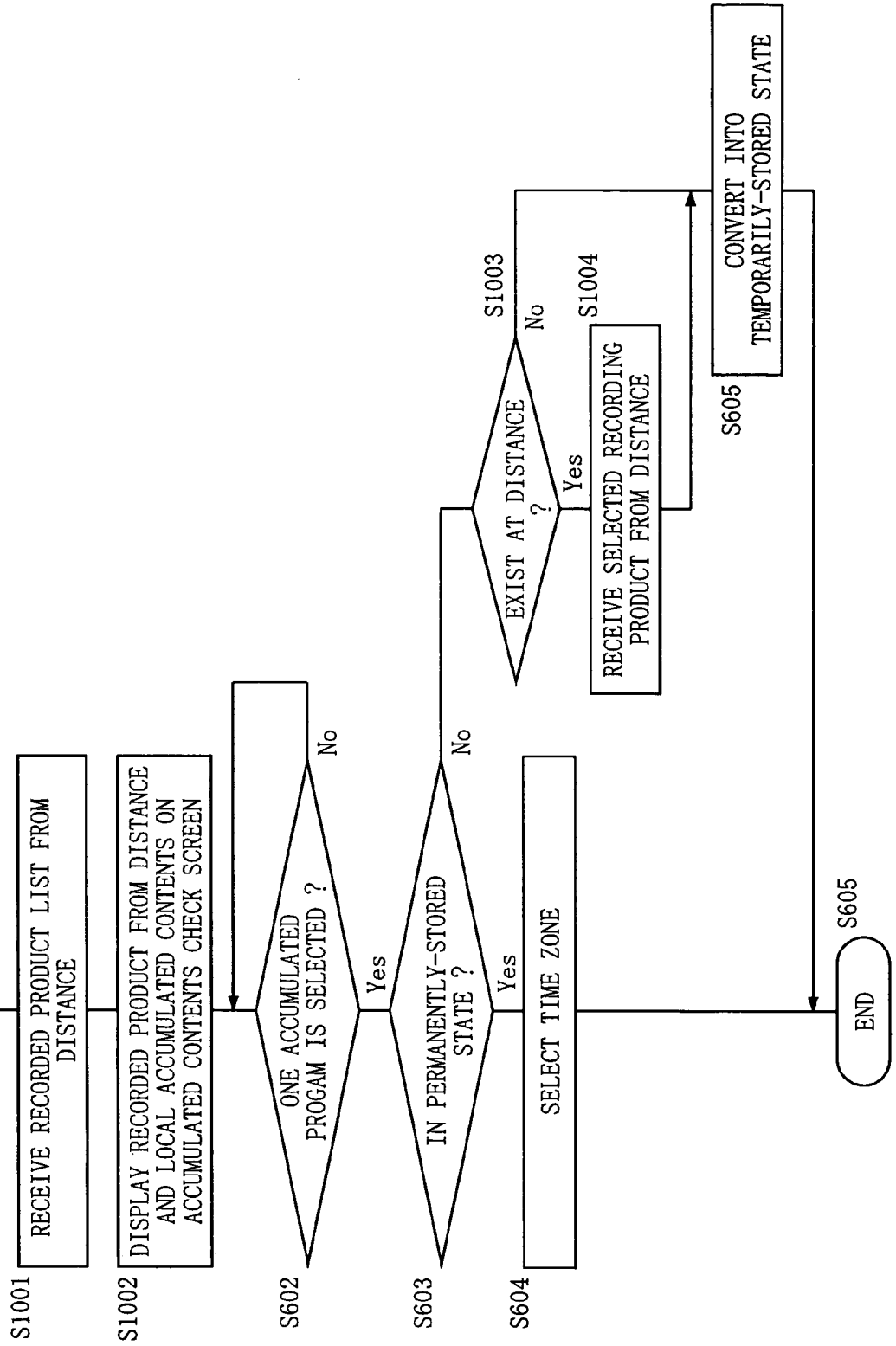
FIG. 9 is a flowchart showing an operation of permanently storing remote recording data by the receiving device illustrated in FIG. 8.

In FIG. 9, a routine for permanently storing remote data which is carried out by the receiving device 1200*e* according to the present embodiment is illustrated in detail. The present routine for permanently storing remote data corresponds to the permanently storing routine according to the second embodiment, which has already been described with reference to FIG. 5, except that step S601 is replaced by steps S1001 and S1002 and that step S1003 and step S1004 are newly added between step S603 and step S605.

Instead of the contents of recorded programs accumulated in the local receiving device 1200*b* being displayed at step S601 described above, in the present embodiment, throughout step S1001 and step S1002 described below, the contents of recorded programs accumulated in a remote receiving device 1200er or a dedicated streaming server 912 are displayed.

Specifically, at step S1001, the receiving device 1200e is connected via a network 920 to a different receiving device 1200e or a dedicated streaming server 912 by means of the communication unit 901. A file list of recorded products accumulated in such a connected, remotely-located device is received. Then, the process proceeds to the next step S1002.

At step S1002, the recorded products accumulated in a remote receiving devices 1200er or a dedicated streaming server 912 which were received at step S1001 and accumulated contents in the local receiving device 1200e are merged into one accumulated program list. The accumulated program list obtained after mergence is displayed on the display unit 104 of the local receiving device 1200e. Then, the process proceeds through step S601 described above to step S603 described above.

At step S603, if a program data file which was determined to be selected at step S602 is in a permanently-stored state, the determination of Yes is made and then the process proceeds to step S604 described above and thereafter the present routine is finished. Meanwhile, the program data file which was determined to be selected at step S602 is not in a permanently-stored state, the determination of No is made and then the process proceeds to step S1003.

At step S1003, if the selected program data file is in the local receiving device 1200e, the determination of No is made and then the process proceeds to step S605 described above and the program data file is converted into a permanently-stored state. Meanwhile, if the selected program data file is in a receiving device 1200er at a distance or a dedicated streaming server 912, the determination of Yes is made and then the process proceeds to step S1004.

At step S1004, the selected program data file is received via the network 920 from a remote receiving device 1200er or a dedicated streaming server 912. Then, the process proceeds to step S605 described above.

As described above, in the present embodiment, in a situation where the (local) receiving device at hand is connected with the Internet at all times, a file of a program which was recorded in a different, remotely-located receiving device or a server which emulates the operations of a receiving device can be treated in the same manner as a file of a program accumulated in the local receiving device. A recording file in a remotely-located server is displayed in a list of files accumulated by the local receiving device, and the file is moved from a distance to be local and stored there in the same manner as a speculatively-recorded one which is local is converted into a permanently-stored state.

Sixth Embodiment

In the present embodiment, the receiving device 1200a according to the first embodiment described above is further provided, while being connected to a different, remotely-located receiving device or a dedicated streaming server over a network which are connected over a network as is the receiving device 1200e according to the fifth embodiment described above, with a function of treating a program data file accumulated in such a remote device in the same manner as a program data file accumulated in the local receiving device 1200e.

In a receiving device 1200f (not shown) according to the present embodiment, a chase viewing is performed utilizing a program data file in a remote receiving device 1200fr. A chase recording is performed also in the local receiving device 1200f, but concerning the part of a program before a chase recording is started, a file in a remote receiving device 1200fr or a dedicated streaming server 912f (corresponding to the streaming server 912) is utilized. This enables a chasing playback to be performed from the beginning of the program even in the case where a chase recording has not been performed from the beginning of the program by the local receiving device 1200f.

The receiving device 1200f according to the present embodiment has the basically same structure as that of the receiving device 1200e illustrated in FIG. 8, but a function of treating a file in a remote receiving device 1200fr or a dedicated streaming server 912r in the same manner as a file in the receiving device 1200f is added newly. Moreover, the receiving device 1200fr and the dedicated streaming server 912f have the same structures as respectively the receiving device 1200er illustrated in FIG. 8 and the dedicated streaming server 912. Therefore, while the description of the structure of the receiving device 1200f according to the present embodiment is omitted for avoiding redundancy, only concerning the function of treating a remotely-located file, the description is made with reference to FIG. 10 and FIG. 11.

Figure 10:
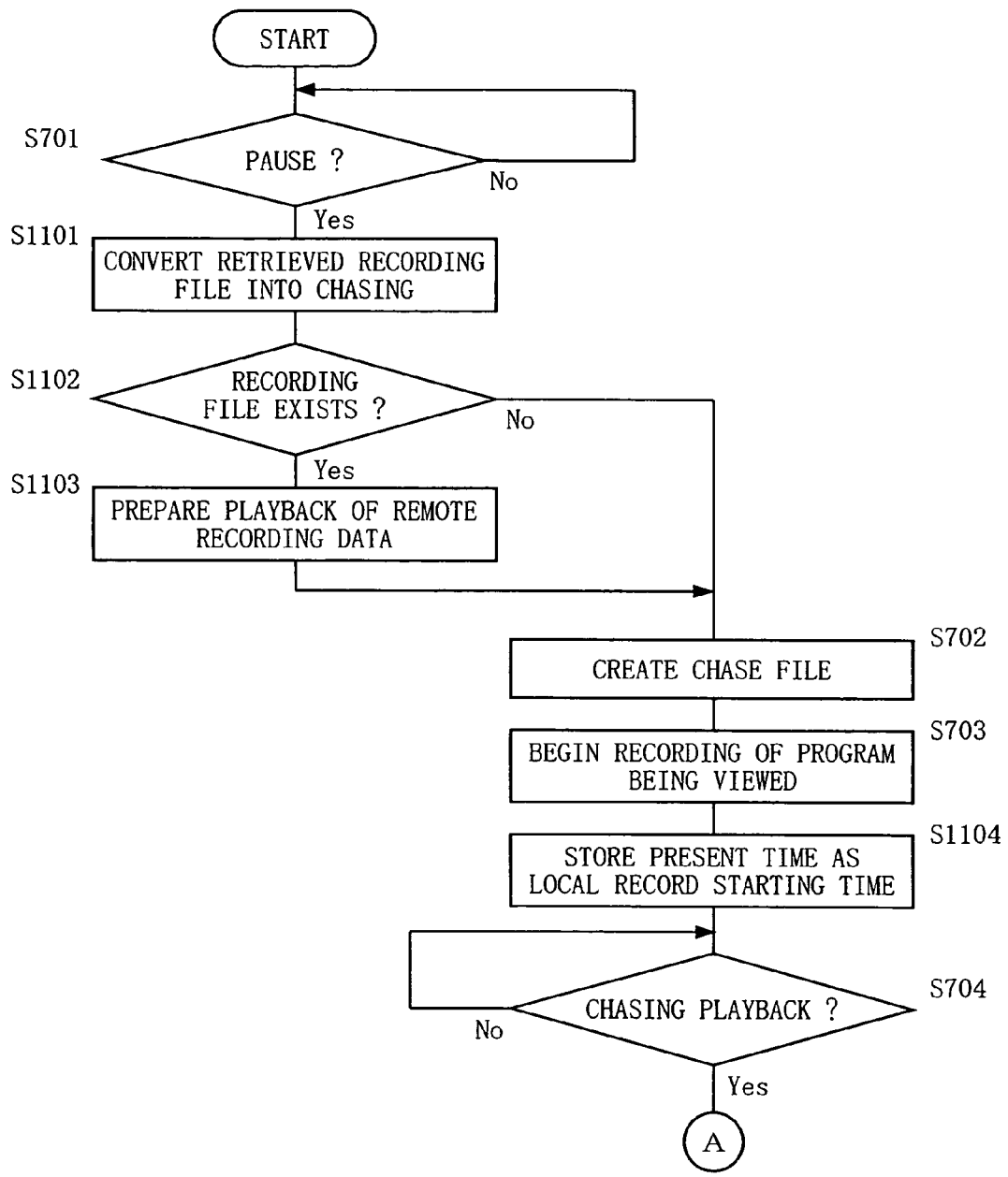
FIG. 10 is a flowchart showing a chasing operation utilizing remote recording data by a receiving device incorporating the speculative recording device according to a sixth embodiment of the present invention.
Figure 11:
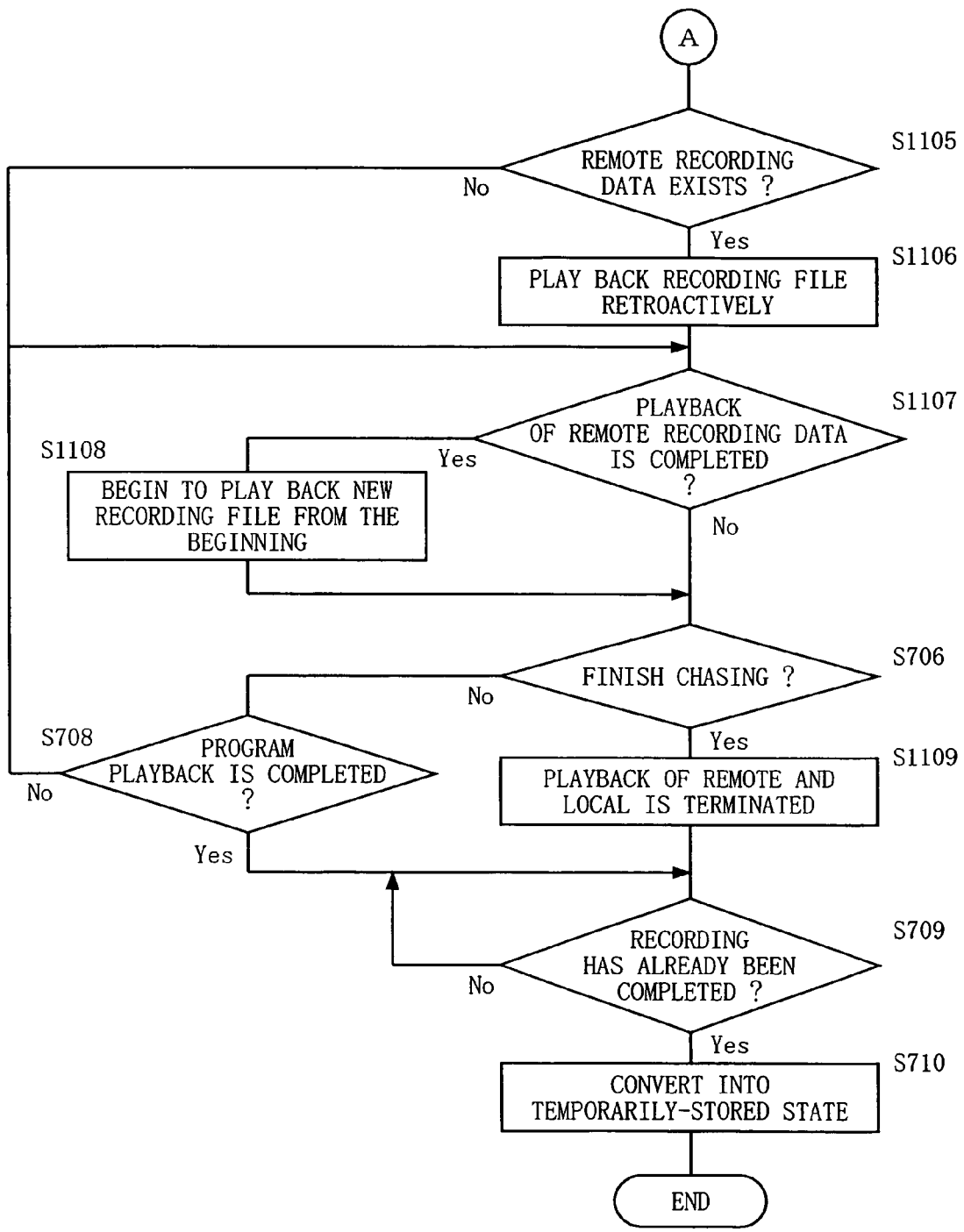
FIG. 11 is a flowchart showing a chasing operation utilizing remote recording data by a receiving device incorporating a speculative recording device according to the sixth embodiment of the present invention.

In FIG. 10 and FIG. 11, a routine for a chasing process utilizing a remote program data file which is carried out by the receiving device 1200f according to the present embodiment is illustrated in detail. The chasing process routine utilizing a remote data file according to the present embodiment corresponds to the chasing playback routine according to the third embodiment, which has already been described with reference to FIG. 6, except that steps S1101, S1102, and S1103 are newly added between step S701 and step S702; step S1104 is added between steps S703 and S704; step S705 is replaced by new steps S1105, S1106, S1107, and S1108; and step S708 is replaced by new step S109. In the receiving device 1200f as structured like this, the present routine is begun by an operation of the pause button by the user as described above, at step S701, and then the process proceeds to the next step S1101.

At step S1101, concerning a program which is being viewed at the moment with the receiving device 1200f, recording data corresponding to the part up to the present moment is searched for within the remote receiving device 1200fr or the dedicated streaming server 912f. Then, the process proceeds to the next step S1102.

At step S1102, if corresponding recording data exists in the remote receiving device 1200fr or the dedicated streaming server 912f, the determination of Yes is made and then the process proceeds to the next step S1103.

At step S1103, a playback of the recording data which exists in the remote receiving device 1200fr or the dedicated streaming server 912f is prepared. Specifically, a preparation is made in the remote receiving device 1200fr or the dedicated streaming server 912f so that whenever a request is made by the receiving device 1200f the playback of the recording data found as a result of search at step S1101 can be done, and, in addition, a preparation is made also in the local receiving device 1200f so that a sufficient receiving bandwidth can be secured in the communication unit 901. Then, the process proceeds through above-described steps S702 and S703 to new step S1104.

Meanwhile, if the determination of No is made at step S1102, that is, if it is determined that no corresponding recording data exists in the remote receiving device 1200fr or the dedicated streaming server 912f, the process skips above-described step S1103 and proceeds through steps S702 and S703 to new step S1104.

At step S1104, the present time TC is memorized as a local record starting time TrL. A local record starting time TrL refers to the starting time Tr of a chase recording in the local receiving device 1200f, which was started at step S703. Then, the process proceeds through above-described step S704 to new step S1105.

At step S1105, if it was determined at above-described step S1102 that recording data exists in the remote receiving device 1200fr or the dedicated streaming server 912f, the process proceeds to the next step S1106. Meanwhile, if it was determined at above-described step S1102 that recording data does not exist in the remote receiving device 1200fr or the dedicated streaming server 912f, the process skips step S1106 and proceeds to new step S1107.

At step S1106, with the program recording data accumulated in the remote receiving device 1200fr or the dedicated streaming server 912f, the playback from the beginning of the program up to the point corresponding to the local record starting time TrL is started. Specifically, the communication unit 901 causes the different receiving device 120fr or the dedicated streaming server 912f via the network 920 to start a playback, which was made ready at step S1103. Then the local receiving device 1200 receives program data of which a playback has been started at the remote side with the communication unit 901, and the data is transmitted to the program decoder 102 and finally is presented to the display unit 104. Then, the process proceeds to the next step S1107.

At step S1107, it is determined whether the playback of the recording data at the remote side has been completed or not. If the determination of Yes is made, the process proceeds to next step S1108. Meanwhile, if the determination of No is made, the process proceeds to above-described step S706. Note that in the case where it was determined at step S1102 that recording file does not exist at a distance, the determination of No is always made at the present step and then the process proceeds to step S706.

At step S1108, the playback of a new recording file is started from the beginning. Then, the process proceeds to step S706. When the playback of the remote recording data has reached the point corresponding to the local record starting time TrL, by starting to play back the recording file recorded in the local receiving device 1200f from the point corresponding to the same time, the chasing playback for the following parts of the program is performed without interruption.

At step S706, if an operation of the chase finishing button by the user is detected, the process proceeds to step S1109.

At step s1109, the one which is being performed of the playback of the program recording data file of the remote side and the playback of the program recording data file of the local side is forcibly terminated. Then, the process proceeds to above-described step S709 and step S710 and thereafter the present routine is finished.

Meanwhile, at step S706, if no operation of the chase finishing button by the user is detected, the process proceeds to above-described step S708. Then, if the finishing of the playback of the program is not detected at step S708, the process returns to above-described step S1107 and the processes at steps S1107, S1108, S706, S1109, or S708 are repeated. If the determination of Yes is made at step S708, the process proceeds to steps S709 and S710 and then the present routine is finished.

As described above, in the present embodiment, in a situation where the (local) receiving device at hand is connected with the Internet at all times, a program file which has been recorded in a different, remotely-located receiving device or a server which emulates the operations of a receiving device is treated in the same manner as a program file accumulated by the local receiving device. In addition, a chase viewing is performed utilizing a remotely-located file. A chase recording is performed in a local receiving device as well, but concerning the part of a program before a chase recording is started, a remotely-located file is utilized. This enables a chasing playback to be performed from the beginning of the program even in the case where a chase recording has not been performed from the beginning of the program at the local side.

Seventh Embodiment

In the seventh embodiment, a function of the above-described receiving device 1200e and different, remotely-located receiving device 1200er vicariously performing a speculative recording for each other is added. Note that, in the present embodiment, a local receiving device and a remote receiving device is identified as respectively a receiving device 1200g and a receiving device 1200gr. In performing a speculative recording, if there is not a sufficient available capacity in the speculative recording managing unit of the receiving device 1200g, the receiving device 1200g requests a remote receiving device 1200gr to perform a vicarious recording. Then, the receiving device 1200gr determines, based on its own available capacity and the degree of importance of the speculative recording, whether to carry out the vicarious recording requested from the receiving device 1200.

Figure 12:
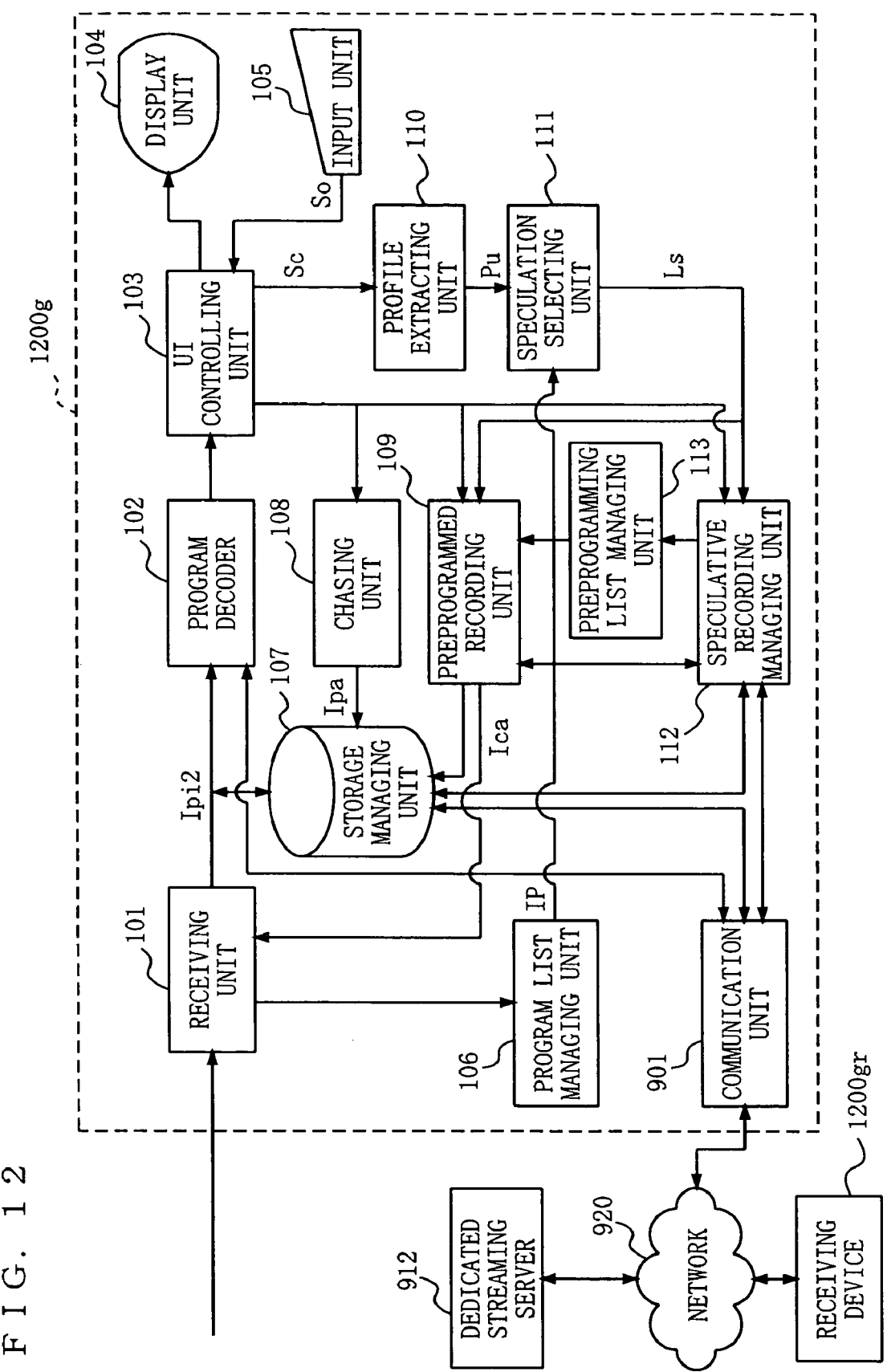
FIG. 12 is a block diagram illustrating a typical example of the structure of a receiving device incorporating a speculative recording device according to a seventh embodiment of the present invention.

In FIG. 12, a structure of the receiving device 1200g according to the present embodiment is illustrated. The receiving device 1200g is such that a preprogramming list managing unit 113 is added to the receiving device 1200e according to the fifth embodiment illustrated in FIG. 8. The receiving device 1200g is connected via the network 920 to a different receiving device 1200gr or a dedicated streaming server 912g (not shown) which emulates the operations of the receiving device 1200g.

With reference to FIG. 13, preprogrammed recording request information Itr which the receiving device 1200g outputs to a remote receiving device 1200gr to request a vicarious recording is briefly described. Preprogrammed recording request information Itr includes preprogrammed recording request information IR, which specifies the subject of a request of preprogrammed recording with respect to each program of which a preprogrammed recording is requested. In the present example, two pieces of preprogrammed recording request information IR1 and IR2 have been created as preprogrammed recording request information Itr.

Each piece of preprogrammed recording request information IR includes a preprogrammed recording request identifier Rr, a request source identifier Isr, a preprogrammed recording program identifier Ip, and a speculation score Ps.

A preprogrammed recording request identifier Rr refers to information which distinguishes each piece of preprogrammed recording request information IR, and, in the present example, IR1 and IR2 correspond thereto. Note that in the case where n, which may be any natural number, pieces of preprogrammed recording request information IR1 to Irn are included in preprogrammed recording request information IR, IR1 to IRn correspond to preprogrammed recording request identifiers Rr.

A request source identifier Isr refers to information which identifies a local receiving device 1200g, and in the present example, 1200g corresponds thereto.

A preprogrammed recording program identifier Ip includes the broadcasting time and broadcast channel of a program of which a recording is requested.

A speculation score Ps refers to a speculation score Ps of a program of which a recording is requested.

Note that in order to distinguish preprogrammed recording request identifiers Rr, request source identifiers Isr, preprogrammed recording program identifiers Ip, and speculation scores Ps of respective pieces of preprogrammed recording request information IR, (n) is added behind each symbol. Specifically, in the present example, the preprogrammed recording request identifier Rr(1) of the preprogrammed recording request information IR1 is "IR1," the request source identifier Isr(l) thereof is "1200g," the preprogrammed recording program identifier Ip(1) thereof is "May 20 9:00-9:30 1 ch," and the speculation score Ps(1) thereof is "8." Note that the preprogrammed recording program identifier Ip(1) indicates a program which is broadcast between 9:00 and 9:30 on May 20 on channel 1.

In the same manner, the preprogrammed recording request identifier Rr(2) of the preprogrammed recording request information IR2 is "IR2," the request source identifier Isr(2) thereof is "1200g," the preprogrammed recording program identifier Ip(2) thereof is "May 21 20:00-20:45 5 ch," and the speculation score Ps(2) thereof is "9." Note that the request source identifiers Isr have the same value in both.

Figure 14:
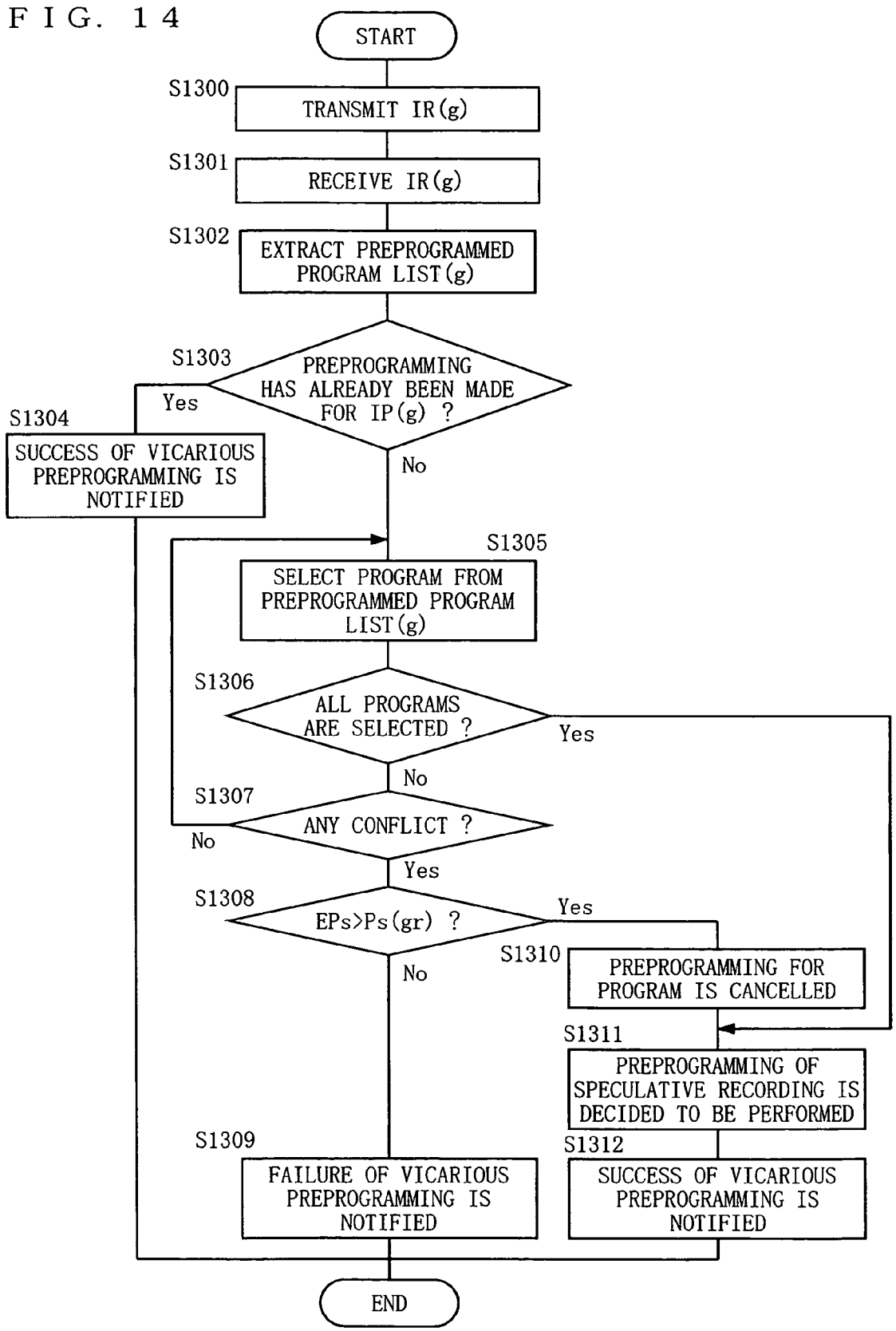
FIG. 14 is a flowchart showing an operation of vicarious preprogrammed recording request process in the speculative recording device illustrated in FIG. 12.
Figure 16:
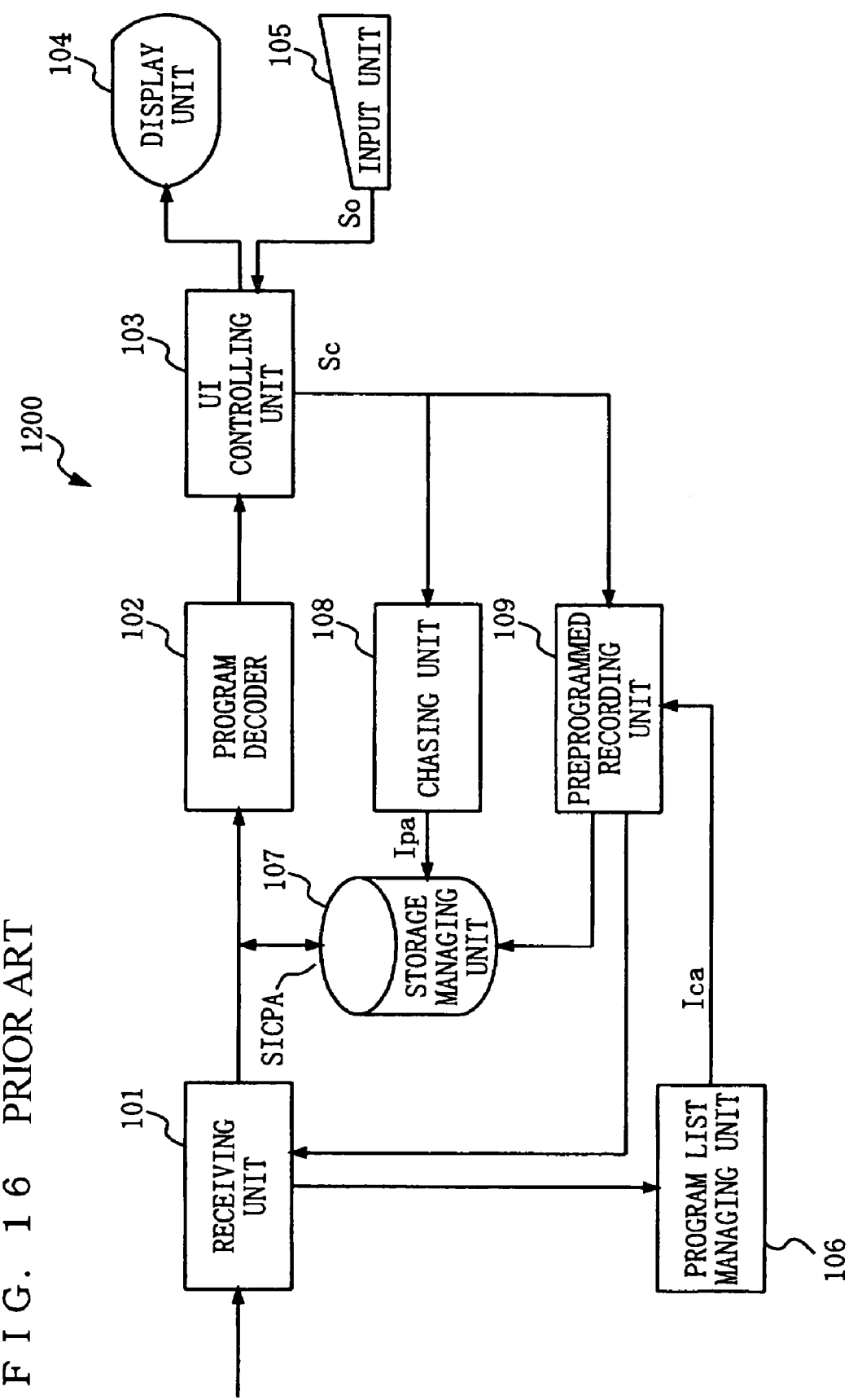
FIG. 16 is a block diagram illustrating the structure of a receiving device incorporating a conventional recording device.

With reference to the flowchart illustrated in FIG. 14, a preprogrammed recording request and request acception process between the receiving device 1200g and a receiving device 1200gr is described in detail. Note that in the present example a description is made taking a case where a preprogrammed recording request is made from the receiving device 1200g to a receiving device 1200gr for example.

First, a preprogrammed recording request process is begun at the time when the local receiving device 1200g outputs preprogrammed recording request information IR as described above via the Internet or the like to all remote receiving devices 1200gr with which it is capable of communicating.

First, at step S1300, the receiving device 1200g creates preprogrammed recording request information IR which requests the vicarious execution of the preprogrammed recording of a program of which a preprogrammed recording cannot be performed owing to the limitation of its own resources, out of the programs of which speculative recordings are to be performed, and transmits it to one receiving device 1200gr. Then, the process proceeds to the next step S1301.

At step S1301, the receiving device 1200gr receives preprogrammed recording request information IR outputted from the receiving device 1200g. Hereafter, the subject of the process is changed from the receiving device 1200g to a receiving device 1200gr. In this sense, a receiving device 1200gr is identified as local and the receiving device 1200g as remote in the following description unless specified otherwise. Moreover, to make the subject of the process clear, (1200g) or (1200gr) is added behind each parameter when necessary, but where space is limited as in the drawings they are written in such a simplified manner as (g) or (gr). Specifically, at the present step, the receiving device 1200gr receives the preprogrammed recording request information IR (1200g) outputted from the receiving device 1200g. Then, the process proceeds to the next step S1302.

At step S1302, in a remote receiving device 1200g, a program list showing programs of which recordings have already been preprogrammed is extracted. Then, the process proceeds to the next step S1303.

At step S1303, it is determined whether a program which a preprogrammed recording program identifier Ip(1200g) indicates is included in the program list extracted at step S1302, that is, whether the recording thereof has been already preprogrammed in the local receiving device 1200gr. If it is preprogrammed, since a preprogrammed recording is performed in the receiving device 1200gr irrespective of a request from the remote receiving device 1200g, that the preprogramming has been successfully performed is notified back to the receiving device 1200g as a result of the determination as to preprogramming. Then, the process is finished. Meanwhile, if it is not preprogrammed, the determination of No is made and the process proceeds to the next step S1305.

At step S1305, one of the programs extracted at step S1302 is selected. Then, the process proceeds to the next step S1306.

At step S1306, it is determined whether all of the programs extracted at step S1302 have been selected or not. If the determination of No is made, the process proceeds to the next step S1307. Meanwhile, if the determination of Yes is made, the process proceeds to step S1311 to be described later.

At step S1307, it is determined whether a program of which a recording is requested from a distance which was selected at step S1305 conflicts with any preprogrammed recording at the local side. Specifically, it is determined whether the broadcast time zone of one program corresponding to a preprogrammed recording program identifier Ip(1200g) overlaps the broadcast time zone of any program to be speculatively recorded in the receiving device 1200gr. If no conflict is detected, the determination of No is made and then the process returns to step S1305 described above. Meanwhile, a conflict is detected, the determination of Yes is made and then the process proceeds to the next step S1308.

At step S1308, it is determined in the local receiving device 1200gr whether a requested program speculation grading score EPs(1200g), which is produced by multiplying the speculation score Ps (1200g) which is included in the preprogrammed recording request information IR by a grading coefficient Ek having a specific value, is higher than the speculation score Ps(1200gr) of a conflicting program of which a speculative recording is preprogrammed. This grading coefficient Ek is provided for avoiding the determination as to acceptance which is simply based on the values of speculation scores Ps, by giving a different weight to the expected value of a recording in the request source indicated by a speculation score Ps (1200g) than to a speculation score Ps(1200gr), which is the expected value of local recording. In other words, at the present step, it is determined whether a preprogrammed recording of a program of which a preprogrammed recording has been requested should be accepted or not. Note that a grading coefficient Ek may vary for each request source (1200g) at a distance or may vary according to a broadcast time zone, a genre of a program, or a storage capacity of a local receiving device (1200g). If the determination of No is made, the process proceeds to the next step S1309. Meanwhile, if the determination of Yes is made, the process proceeds to step S1310.

At step S1309, without a requested preprogramming concerning a program being accepted, the failure of preprogramming is notified back to the receiving device 1200g as a result of the determination as to preprogramming.

At step S1310, from the program list extracted at step S1302, the preprogramming for a program for which the determination of Yes is made at step S1308 is cancelled. Then, the process proceeds to the next step S1311.

At step S1311, speculative recordings of programs for which the determination of Yes was made at step S1303 and step S1308 while proceeding through steps S1305 to S1310 described above and of programs of which the erasure was not made at step S1310 are decided to be performed. Then, the process proceeds to the next step S1312.

At step S1312, concerning a program for which the determination of Yes was made at step S1308, the success of preprogramming is notified back to the receiving device 1200g. Then, the process is completed.

Note that the receiving device 1200g, based on a preprogramming notification result notified back from each receiving device 1200gr, recognizes, with respect to each program, the receiving device 1200gr which vicariously performs a speculative recording preprogramming and creates vicarious speculative recording preprogramming information.

Note that by repeating steps S1301 to S1312 described above for each receiving device 1200gr to which preprogrammed recording request information IR was transmitted at step S1300, the receiving device 1200g can diversify vicarious executions of speculative recording preprogramming into all receiving devices 1200gr available. In requesting a vicarious execution of preprogrammed recording to a different receiving device 1200gr, it is desirable to create preprogrammed recording request information IR while excluding the preprogrammed recording program identifier(s) Ip of a program(s) for which the success of preprogramming has been determined by a preceding receiving device(s) 1200gr.

Note that the processes of steps S1302 to S1311 described above are carried out mainly by the preprogramming list managing unit 113.

Next, with reference to FIG. 15, the details of the above-described process by the preprogramming list managing unit 113 are described specifically. In the present figure, a typical example of preprogramming list managing data DA produced within the preprogramming list managing unit 113 is illustrated. Preprogramming list managing data DA includes preprogrammed recording information IIR which specifies the subject of the request of preprogrammed recording with respect to each program of which a preprogrammed recording is to be performed. In the present example, five pieces of preprogrammed recording information IIR1 to IIR5 are produced as preprogrammed recording information IIR.

Each piece of preprogrammed recording information IIR includes a preprogrammed recording identifier IRr, a preprogrammed recording program identifier Ip, a recording mode identifier Fr, a requested program speculation grading score EPs, a request source identifier Isr, and a request destination identifier Ise. The preprogrammed recording program identifier Ip, the requested program speculation grading score EPs, and the request source identifier Isr are the same as those of the information included in the above-described preprogrammed recording request information IR.

A preprogrammed recording identifier IRr is information specifying the content of the preprogrammed recording of each program, managed by the preprogramming list managing unit 113. In the present example, it is assumed that preprogrammed recordings of five programs are to be managed.

A recording mode identifier Fr is information which specifies the mode of preprogrammed recording. In the present example, either of the two kinds, that is, speculative recording preprogramming and preprogrammed recording request, is set.

A request destination identifier Ise is information which specifies the destination, that is, a different receiving device 1200g or a receiving device 1200gr-b, to which the receiving device 1200gr gives a request of preprogrammed recording.

In the present example, the preprogrammed recording information IIR1 specifies a recording requested from the receiving device 1200g. Specifically, it shows that the speculation score Ps of the program which is set in the receiving device 1200g as an object of a speculative recording and which is broadcast between 8:15 and 8:30 on May 10 on channel 1 is 3, that the grading coefficient Ek thereof is 0.8, and that the requested program speculation grading score EPs thereof is 2.4.

The preprogrammed recording information IIR2 specifies a speculative recording of the receiving device 1200gr itself. Specifically, it shows that the speculation score Ps of the program which is broadcast between 9:00 and 10:00 on May 20 on channel 5 is 2, that the grading coefficient Ek thereof is 1, and that the requested program speculation grading score EPs thereof is 2. The reason why the grading coefficient Ek of the preprogrammed recording information IIR1 is 0.8 while the grading coefficient Ek of the preprogrammed recording information IIR2 is 1 is that there is an intention of giving some priority to its own preprogrammed recording.

The preprogrammed recording information IIR3 specifies a speculative recording requested from a different receiving device 1200gr-b. Specifically, it shows that the speculation score Ps of the program which is broadcast between 9:00 and 9:30 on May 20 on channel 1 is 8, that the grading coefficient Ek thereof is 0.5, and that the requested program speculation grading score EPs thereof is 4. The reason why the grading coefficient Ek of the preprogrammed recording information IIR1 is 0.8 while the grading coefficient Ek of the preprogrammed recording information IIR3 is 0.5 is that there is an intention of giving priority to a request from the receiving device 1200g over a request from the receiving device 1200gr-b.

The preprogrammed recording information IIR4 specifies a speculative recording of the receiving device 1200gr itself. Specifically, it shows that the speculation score Ps of the program which is broadcast between 20:00 and 20:30 on May 21 on channel 7 is 6, that the grading coefficient Ek thereof is 1, and that the requested program speculation grading score EPs thereof is 6.

The preprogrammed recording information IIR5 specifies a preprogrammed recording which the receiving device 1200gr requests to a receiving device 1200gr-b at a distance. Specifically, it shows that the speculation score Ps of the program which is broadcast between 8:00 and 9:00 on May 10 on channel 7 is 6, that the grading coefficient Ek thereof is 1, and that the requested program speculation grading score EPs thereof is 6.

In the present example, the broadcast times of the programs of which preprogrammed recordings are requested by the preprogrammed recording information IIR2 and the preprogrammed recording information IIR3 coincide. In this case, based on that the requested program speculation grading score EPs(IIR2) is 2 and the requested program speculation grading score EPs (IIR3) is 4, the preprogramming list managing unit 113 accepts the request of the preprogrammed recording of the preprogrammed recording information IIR3 and, in addition, notifies the success of preprogramming to the receiving device 1200gr-b. On the other hand, it refuses the request of the preprogrammed recording of the preprogrammed recording information IIR2 and, in addition, notifies the failure of preprogramming to the receiving device 1200gr.

Note that, in the present example, the receiving device 1200gr, when receiving a notice of the failure of preprogramming from the receiving device 1200gr itself, erases the preprogrammed recording information IIR2 itself.

Note that, needless to say, a similar process is carried out in the receiving device 1200gr-b concerning the preprogrammed recording information IIR5.

As described above, in the present invention, since a recording file created in a preprogrammed recording, a file created in a speculative recording, a file created in a chase recording, and a file contained in a different receiving device which is connected via a network can be equally treated with user interfaces which look the same to a user, the sophisticated function as described above can be enjoyed without necessity of learning a special operation.

Moreover, the vicarious execution of a preprogrammed recording can be requested to a different receiving device via a network or the like. And since the receiving device to which a request is given can determine whether or not to accept the request according to the degrees of importance of its own speculative recording and the requested recording, diversified recordings can be carried out complementarily.

INDUSTRIAL APPLICABILITY

As described above, the present invention can be applied to a receiving device having a function of once accumulating a program which is broadcast or delivered in real time via an electrical transmitting means such as digital broadcasting and the Internet, thereby making it possible to view it asynchronously to broadcast or delivery. Further, it can be applied to a receiving device which is capable of performing a chase recording and to receiving devices capable of performing diversified accumulation between one another.

The invention claimed is:

1. A speculative recording device comprising:
profile extracting means for extracting a user profile which indicates a preference of a user in viewing programs based on an operation by the user;
program list managing means for acquiring attributes of a program;
speculation selecting means for selecting a program to be speculatively recorded based on the user profile and the attributes of the program;
storage managing means for accumulating program data;
speculative recording managing means for erasing the program data accumulated in the storage managing means when necessary and for recording program data selected by the speculation selecting means;
user interface controlling means for converting a state of the program data accumulated in the storage managing means between a temporarily-stored state and a permanently-stored state in accordance with a request from the user, wherein the program data accumulated in the storage managing means is in either one of the temporarily-stored state and the permanently-stored state, and the speculative recording managing means erases, among the program data accumulated in the storage managing means, a piece of program data in the temporarily-stored state when necessary and records the program data selected by the speculation selecting means in the temporarily-stored state;
communication means for communicating with a network connected with at least one remotely-located program recording device, wherein
when the user interface controlling means performs an operation of converting a state of a piece of program data selected by the user from among programs accumulated by the at least one remotely-located program recording device and the program data accumulated in the storage managing means into the permanently-stored state in accordance with a request from the user while utilizing the communication means, if the piece of program data selected by the user is a piece of program data accumulated in one of the at least one remotely-located recording device, the selected piece of program data is taken into the storage managing means via the communication means to be converted into the permanently-stored state; and
chasing means for, after beginning a process of accumulating a currently-broadcast program into a file in the temporarily-stored state from a record starting time to an end of the program, beginning to play back the file at a playback starting time.

2. The speculative recording device 1, wherein:
the user interface controlling means inputs a record starting time and a playback starting time from the user; and
when there is a program data file which is program data accumulated in one of the at least one remotely-located program recording device and which is of a program identical to a currently-broadcast program to be accumulated by the chasing means, the chasing means starts, by utilizing the communication means, playing back the program data file of the identical program at the playback starting time.

3. The speculative recording device according to claim 2, wherein the chasing means starts playing back the program data file of the identical program at the playback starting time and, at a time point of the record starting time or later, changes the played-back file from the identical file to a file conducted for the storage managing means.

* * * * *